(12) United States Patent
Chang et al.

(10) Patent No.: US 9,637,582 B2
(45) Date of Patent: May 2, 2017

(54) POLYMERIZABLE POLYSILOXANES WITH HYDROPHILIC SUBSTITUENTS

(71) Applicant: Novartis AG, Basel (CH)

(72) Inventors: Frank Chang, Cumming, GA (US); Jinyu Huang, Suwanee, GA (US); Venkat Shankar, Suwanee, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 14/859,486

(22) Filed: Sep. 21, 2015

(65) Prior Publication Data

US 2016/0090432 A1 Mar. 31, 2016

Related U.S. Application Data

(60) Provisional application No. 62/055,761, filed on Sep. 26, 2014.

(51) Int. Cl.

| | | |
|---|---|---|
| *C08L 83/04* | (2006.01) | |
| *C08F 230/08* | (2006.01) | |
| *C08G 77/42* | (2006.01) | |
| *C08G 77/442* | (2006.01) | |
| *G02C 7/04* | (2006.01) | |
| *G02B 1/04* | (2006.01) | |
| *C08J 3/03* | (2006.01) | |
| *C08J 3/075* | (2006.01) | |
| *C08F 220/00* | (2006.01) | |
| *C08J 3/28* | (2006.01) | |
| *C08F 290/06* | (2006.01) | |
| *C08G 77/20* | (2006.01) | |
| *C08G 77/38* | (2006.01) | |
| *C08G 77/445* | (2006.01) | |
| *C08G 77/48* | (2006.01) | |
| *C08L 51/08* | (2006.01) | |
| *C08L 83/06* | (2006.01) | |
| *C08L 83/10* | (2006.01) | |
| *C08L 83/14* | (2006.01) | |

(52) U.S. Cl.
CPC .......... *C08F 230/08* (2013.01); *C08F 220/00* (2013.01); *C08F 290/068* (2013.01); *C08G 77/20* (2013.01); *C08G 77/38* (2013.01); *C08G 77/42* (2013.01); *C08G 77/442* (2013.01); *C08G 77/445* (2013.01); *C08G 77/48* (2013.01); *C08J 3/03* (2013.01); *C08J 3/075* (2013.01); *C08J 3/28* (2013.01); *C08L 51/085* (2013.01); *C08L 83/06* (2013.01); *C08L 83/10* (2013.01); *C08L 83/14* (2013.01); *G02B 1/043* (2013.01); *G02C 7/04* (2013.01)

(58) Field of Classification Search
None
See application file for complete search history.

(56) References Cited

U.S. PATENT DOCUMENTS

| | | | |
|---|---|---|---|
| 4,260,725 A | 4/1981 | Keogh et al. | |
| 4,444,711 A | 4/1984 | Schad | |
| 4,460,534 A | 7/1984 | Boehm et al. | |
| 4,485,236 A | 11/1984 | Rasmussen et al. | |
| 5,760,100 A | 6/1998 | Nicolson et al. | |
| 5,807,944 A * | 9/1998 | Hirt ...................... | C08F 290/02 351/159.04 |
| 5,843,346 A | 12/1998 | Morrill | |
| 5,894,002 A | 4/1999 | Boneberger et al. | |
| 6,039,913 A | 3/2000 | Hirt et al. | |
| 6,043,328 A | 3/2000 | Domschke et al. | |
| 6,367,929 B1 | 4/2002 | Maiden et al. | |
| 6,627,124 B1 | 9/2003 | Herbrechtsmeier et al. | |
| 6,719,929 B2 | 4/2004 | Winterton et al. | |
| 6,800,225 B1 | 10/2004 | Hagmann et al. | |
| 6,822,016 B2 | 11/2004 | McCabe et al. | |
| 7,091,283 B2 | 8/2006 | Muller et al. | |
| 7,238,750 B2 | 7/2007 | Muller et al. | |
| 7,268,189 B2 | 9/2007 | Muller et al. | |
| 7,384,590 B2 | 6/2008 | Kelly et al. | |
| 7,387,759 B2 | 6/2008 | Kelly et al. | |
| 7,521,519 B1 | 4/2009 | Hirt et al. | |
| 7,858,000 B2 | 12/2010 | Winterton | |

(Continued)

FOREIGN PATENT DOCUMENTS

| | | | |
|---|---|---|---|
| CH | WO 9749740 A1 * | 12/1997 | ............ C08F 290/02 |
| DK | WO 2013000478 A1 * | 1/2013 | ........... C09D 183/04 |

(Continued)

OTHER PUBLICATIONS

Coqueret, et al., Synthesis and properties of photoreactive polysiloxanes containing pendant functional groups, Pure & Appl. Chem., 1990, pp. 1603-1614, vol. 62, No. 8, IUPAC, Great Britain.

(Continued)

*Primary Examiner* — Peter A Salamon
(74) *Attorney, Agent, or Firm* — Jian Zhou

(57) ABSTRACT

The invention provides an actinically-polymerizable amphiphilic polysiloxane which comprises a polysiloxane polymer chain comprising a polylsiloxane segments comprising at least one siloxane unit having a low molecular weight hydrophilic polymer chain connected with a silicone atom of the siloxane unit, and (meth)acrylamido groups each covalently bonded to one of the ends of the polysiloxane polymer chain and/or to the end of one of low molecular weight hydrophilic polymer chains each connected with one silicone atom. The present invention is also related to a polymer, an actinically-crosslinkable silicone-containing prepolymer, a silicone hydrogel polymeric material, or a silicone hydrogel contact lens, which comprises repeating units derived from an actinically-polymerizable amphiphilic polysiloxane of the invention. In addition, the invention provides a method for making silicone hydrogel contact lenses using a water-based lens-forming formulation comprising an actinically-polymerizable amphiphilic polysiloxane of the invention and/or an actinically-crosslinkable silicone-containing prepolymer of the invention.

16 Claims, No Drawings

(56) References Cited

U.S. PATENT DOCUMENTS

| | | | |
|---|---|---|---|
| 8,044,111 B2 | 10/2011 | Chang et al. | |
| 8,048,968 B2 | 11/2011 | Phelan et al. | |
| 8,071,703 B2 | 12/2011 | Zhou et al. | |
| 8,110,651 B2 | 2/2012 | Yoon et al. | |
| 8,147,897 B2 | 4/2012 | Ferreiro et al. | |
| 8,409,599 B2 | 4/2013 | Wu et al. | |
| 8,557,940 B2 * | 10/2013 | Chang | C08G 77/388 351/159.02 |
| 9,052,440 B2 * | 6/2015 | Kuyu | C08G 77/42 |
| 9,097,840 B2 | 8/2015 | Chang et al. | |
| 9,103,965 B2 * | 8/2015 | Chang | C07F 7/0849 |
| 9,109,091 B2 * | 8/2015 | Chang | C08F 290/068 |
| 9,268,064 B2 | 2/2016 | Chang et al. | |
| 2008/0015315 A1 | 1/2008 | Chang et al. | |
| 2008/0143003 A1 | 6/2008 | Phelan | |
| 2008/0143958 A1 | 6/2008 | Medina et al. | |
| 2008/0231798 A1 | 9/2008 | Zhou et al. | |
| 2008/0234457 A1 | 9/2008 | Zhou et al. | |
| 2010/0120939 A1 | 5/2010 | Phelan | |
| 2010/0298446 A1 | 11/2010 | Chang et al. | |
| 2011/0134387 A1 | 6/2011 | Samuel et al. | |
| 2012/0026457 A1 | 2/2012 | Qiu et al. | |
| 2012/0029111 A1 | 2/2012 | Chang et al. | |
| 2012/0088843 A1 | 4/2012 | Chang et al. | |
| 2012/0088844 A1 | 4/2012 | Kuyu et al. | |
| 2012/0088861 A1 | 4/2012 | Huang et al. | |
| 2013/0118127 A1 | 5/2013 | Kolluru et al. | |
| 2014/0005430 A1 * | 1/2014 | Chang | C08G 77/388 556/420 |
| 2014/0170426 A1 * | 6/2014 | Thorlaksen | C09D 183/04 428/447 |
| 2014/0171539 A1 * | 6/2014 | Chang | C08F 220/58 522/172 |
| 2014/0171542 A1 * | 6/2014 | Chang | C07F 7/0849 523/107 |
| 2014/0171543 A1 * | 6/2014 | Chang | C08G 18/755 523/107 |
| 2014/0350124 A1 | 11/2014 | Kuyu et al. | |
| 2015/0011667 A1 * | 1/2015 | Saxena | C08G 77/20 522/13 |
| 2015/0152228 A1 | 6/2015 | Chang et al. | |
| 2015/0153482 A1 | 6/2015 | Chang et al. | |
| 2015/0309213 A1 | 10/2015 | Chang | |
| 2015/0315213 A1 | 11/2015 | Chang et al. | |
| 2016/0033683 A1 | 2/2016 | Huang et al. | |
| 2016/0090432 A1 * | 3/2016 | Chang | C08F 230/08 523/107 |

FOREIGN PATENT DOCUMENTS

| | | |
|---|---|---|
| WO | 97/49740 A1 | 12/1997 |
| WO | 2013/142062 A2 | 9/2013 |

OTHER PUBLICATIONS

Makino, et al., Chemistry of 2-Oxazolines: A Crossing of Cationic Ring-Opening Polymerization and Enzymatic Ring-Opening Polyaddition, Wiley InterScience (www.interscience.wiley.com), Journal of Polymer Science: Part A: Polymer Chemistry, vol. 48, 2010 pp. 1251-1270.

International Searching Authority, International Search Report and Written Opinion, PCT/US2015/051127, Jan. 8, 2016, 13 pages.

* cited by examiner

POLYMERIZABLE POLYSILOXANES WITH HYDROPHILIC SUBSTITUENTS

This application claims the benefit under 35 USC §119 (e) of U.S. provisional application No. 62/055,761 filed 26 Sep. 2014, incorporated by reference in its entirety.

The present invention is related to a class of polymerizable polysiloxanes with hydrophilic substituents and uses thereof. In particular, the present invention is related to silicone hydrogel contact lenses made from a lens formulation including a polymerizable polysiloxane with hydrophilic substituents.

BACKGROUND

In recent years, soft silicone hydrogel contact lenses become more and more popular because of their high oxygen permeability and comfort. "Soft" contact lenses can conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

One of lens forming materials widely used in making silicone hydrogel contact lenses is polymerizable polysiloxane. The main function of the polymerizable polysiloxane is to provide high oxygen permeability to resultant contact lenses. However, because of its hydrophobic nature, a polymerizable polysiloxane is generally not compatible with hydrophilic components in a lens formulation, including, e.g., hydroxyethylmethacrylate, hydroxyethylacrylate, N,N-dimethylacrylamide, N-vinylpyrrolidone, or an internal wetting agent. It would be difficult to obtain homogeneous lens formulations.

Therefore, there is a need for new actinically-polymerizable polysiloxanes suitable for making silicone hydrogel contact lenses.

SUMMARY OF THE INVENTION

The present invention, in one aspect, provides an actinically polymerizable amphiphilic polysiloxane. The amphiphilic polysiloxane of the invention comprises: (1) a polysiloxane polymer chain comprising a polylsiloxane segments including at least one siloxane unit having a hydrophilic polymer chain connected with a silicone atom of the siloxane unit; (2) two or more (meth)acrylamido groups each covalently bonded to one of the ends of the polysiloxane polymer chain and/or to the end of one of the hydrophilic polymer chains each connected with one silicone atom, wherein any polymer chain connecting two (meth)acrylamido groups in the actinically polymerizable amphiphilic polysiloxane is, in the backbone of said polymer chain, free of any bond selected from the group consisting of ester bond without a tertiary carbon atom adjacent to the carbonyl group of the ester bond, urethane bond, urea bond, and combination thereof.

In another aspect, the invention provides a silicone hydrogel contact lens comprising units derived from an actinically polymerizable amphiphilic polysiloxane.

In a further aspect, the invention provides a method for producing soft contact lenses. The method comprises the steps of: providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; introduce a lens-forming material into the cavity, wherein the lens-forming material comprises one or more actinically polymerizable amphiphilic polysiloxanes of the invention; and actinically irradiating the composition in the mold to crosslink the lens-forming material to form the contact lens.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

An "ophthalmic device", as used herein, refers to a contact lens (hard or soft), an intraocular lens, a corneal onlay, other ophthalmic devices (e.g., stents, glaucoma shunt, or the like) used on or about the eye or ocular vicinity.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a cross-linked polymeric material which is insoluble in water, but can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or at least one silicone-containing vinylic macromer or at least one actinically-crosslinkable silicone-containing prepolymer.

"Hydrophilic," as used herein, describes a material or portion thereof that will more readily associate with water than with lipids.

A "vinylic monomer" refers to a compound that has one sole ethylenically unsaturated group and is soluble in a solvent.

The term "soluble", in reference to a compound or material in a solvent, means that the compound or material can be dissolved in the solvent to give a solution with a concentration of at least about 0.5% by weight at room temperature (i.e., a temperature of about 20° C. to about 30° C.).

The term "insoluble", in reference to a compound or material in a solvent, means that the compound or material can be dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl methacryloyl

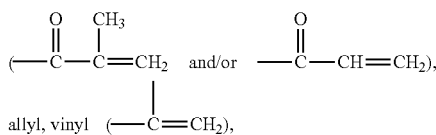

styrenyl, or other C=C containing groups.

The term "ene group" refers to a monovalent radical comprising $CH_2=CH-$ that is not covalently attached to an oxygen or nitrogen atom or a carbonyl group.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionizing radiation (e.g. gamma ray or X-ray irradiation), microwave irradiation, and the like. Thermal curing or actinic curing methods are well-known to a person skilled in the art.

The term "(meth)acrylamide" refers to methacrylamide and/or acrylamide.

The term "(meth)acrylate" refers to methacrylate and/or acrylate.

The term "(meth)acrylamido" refers to an actinically polymerizable group of

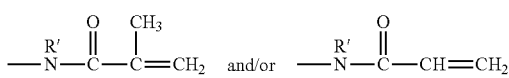

in which R' is hydrogen or $C_1$-$C_{10}$-alkyl.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a compound or polymer that contains ethylenically unsaturated groups and has an average molecular weights greater than 700 Daltons.

A "polymer" means a material formed by polymerizing/crosslinking one or more vinylic monomers, macromers and/or prepolymers.

"Molecular weight" of a polymeric material (including monomeric or macromeric materials), as used herein, refers to the number-average molecular weight unless otherwise specifically noted or unless testing conditions indicate otherwise.

The term "low molecular weight" in reference to a hydrophilic polymer chain means that the polymer chain has an average molecular weight of from 250 to 100,000 Daltons, preferably from 400 to 50,000 Daltons, more preferably from 500 to 250,000 Daltons, even more preferably from 750 to 150,000 Daltons, and is based on the average molecular weight of a starting hydrophilic polymer before being attached to a polysiloxane.

A "polysiloxane segment" refers to a divalent radical of

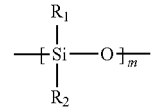

in which $R_1$ and $R_2$, independently of one another, are $C_1$-$C_8$-alkyl, $C_1$-$C_4$ alkyl- or $C_1$-$C_4$-alkoxy-substituted phenyl, fluoro-substituted $C_1$-$C_{18}$-alkyl, a low molecular weight hydrophilic polymer chain, or -alk-$(OCH_2CH_2)_n$-OE in which alk is $C_1$-$C_6$-alkylene divalent radical, E is hydrogen or $C_1$-$C_6$ alkyl and n is an integer from 1 to 50, m is an integer of from 2 to 500 and.

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxyl, —$NH_2$, sulfhydryl, $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, an "oxazoline" refers to a compound of

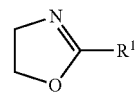

in which $R^1$ is hydrogen, methyl or ethyl group.

A "polyoxazoline segment" refers to a divalent radical of

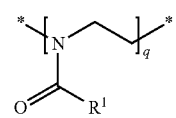

in which $R^1$ is hydrogen, methyl or ethyl group, and q is an integer from 3 to 500.

The term "azetidinium" refers to a positively-charged, divalent radical (or group or moiety) of

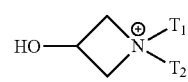

in which $T_1$ and $T_2$ are a direct bond.

The term "azlactone" refers to a mono-valent radical of

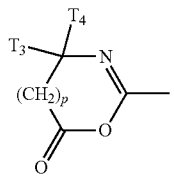

in which p is 0 or 1; $T_3$ and $T_4$ independently of each other is $C_1$-$C_8$ alkyl (preferably methy).

In this application, the term "backbone" in reference to a polysiloxane, polymer, polymer chain or compound means the principal chain of polysiloxane, polymer, polymer chain or compound, which consists of one sole chain of atoms connected by covalent bonds. It should be understood that all pendant groups and side chains are not considered to be parts of the backbone.

As used herein, the term "multiple" refers to three or more.

A "crosslinker" refers to a compound having at least two ethylenically-unsaturated groups. A "crosslinking agent" refers to a compound with two or more ethylenically unsaturated groups and with molecular weight less than 700 Daltons. Examples of preferred cross-linking agents include without limitation N,N'-methylene-bis-(meth)acrylamide, N,N'-ethylene-bis-(meth)acrylamide, N,N'-dihydroxyethylene-bis-(meth)acrylamide, 1,3-bis(acrylamidopropyl)-1,1,3,3-tetramethyldisiloxane, 1,3-bis(methacrylamidopropyl)-1,1,3,3-tetramethyldisiloxane, tetraethyleneglycol di-(meth)acrylate, triethyleneglycol di-(meth)acrylate, ethyleneglycol di-(meth)acrylate, diethyleneglycol di-(meth)acrylate, trimethylopropane trimethacrylate, pentaerythritol tetramethacrylate, bisphenol A di methacrylate, vinyl methacrylate, glycerol dimethacrylate, triallyl isocyanurate, triallyl cyanurate, allyl(meth)acrylate, 1,3-bis(methacrylamidopropyl)-1,1,3,3-tetrakis(trimethylsiloxy)disiloxane, N,N'-methylenebis(meth)acrylamide, N,N'-ethylenebis(meth)acrylamide, 1,3-bis(N-(meth)acrylamidopropyl)-1,1,3,3-tetrakis-(trimethylsiloxy)disiloxane, 1,3-bis(methacrylamidobutyl)-1,1,3,3-tetrakis(trimethylsiloxy)-disiloxane, 1,3-bis(methacryloxyethylureidopropyl)-1,1,3,3-tetrakis(trimethylsiloxy)disiloxane, and combinations thereof. A preferred crosslinking agent is N,N'-methylene-bis-(meth)acrylamide, N,N'-ethylene-bis-(meth)acrylamide, N,N'-dihydroxyethylene-bis-(meth)acrylamide, 1,3-bis(acrylamidopropyl)-1,1,3,3-tetramethyldisiloxane, 1,3-bis(methacrylamidopropyl)-1,1,3,3-tetramethyldisiloxane, or combination thereof.

A free radical initiator can be either a photoinitiator or a thermal initiator. A "photoinitiator" refers to a chemical that initiates free radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types of photoinitiators, and Irgacure® types of photoinitiators, preferably Darocure® 1173, and Irgacure® 2959. Examples of benzoylphosphine oxide initiators include 2,4,6-trimethylbenzoyldiphenylophosphine oxide (TPO); bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "polymerizable UV-absorbing agent" or "UV-absorbing vinylic monomer" refers to a compound comprising an ethylenically-unsaturated group and a UV-absorbing moiety or a latent UV-absorbing moiety.

A "UV-absorbing moiety" refers to an organic functional group which can absorb or screen out UV radiation in the range from 200 nm to 400 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV) permeable region, a radiation (e.g., UV) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV radiation) limits radiation (e.g., UV radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV beam (i.e., a spatial limitation of radiation). The radiation used for the crosslinking is a radiation energy, especially UV radiation, gamma radiation, electron radiation or thermal radiation, the radiation energy preferably being in the form of a substantially parallel beam in order on the one hand to achieve good restriction and on the other hand efficient use of the energy.

In the conventional cast-molding process, the first and second molding surfaces of a mold are pressed against each other to form a circumferential contact line which defines the edge of a result contact lens. Because the close contact of the molding surfaces can damage the optical quality of the molding surfaces, the mold cannot be reused. In contrast, in the Lightstream Technology™, the edge of a resultant contact lens is not defined by the contact of the molding surfaces of a mold, but instead by a spatial limitation of radiation. Without any contact between the molding surfaces of a mold, the mold can be used repeatedly to produce high quality contact lenses with high reproducibility.

"Dye" means a substance that is soluble in a lens-forming fluid material and that is used to impart color. Dyes are typically translucent and absorb but do not scatter light.

A "pigment" means a powdered substance (particles) that is suspended in a lens-forming composition in which it is insoluble.

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367, 929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment or physical deposition of one or more layers of one or more hydrophilic polymer onto the surface of a contact lens disclosed in U.S. Pat. Nos. 8,147,897 and 8,409,599 and US Patent Application Publication Nos. 2011/0134387, 2012/0026457 and 2013/0118127 (herein incorporated by references in their entireties).

"Post-curing surface treatment", in reference to a silicone hydrogel material or a soft contact lens, means a surface treatment process that is performed after the formation (curing) of the hydrogel material or the soft contact lens in a mold.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (advancing angle measured by Sessile Drop), which is obtained by averaging measurements of at least 3 individual contact lenses.

The intrinsic "oxygen permeability", Dk, of a material is the rate at which oxygen will pass through a material. As used in this application, the term "oxygen permeability (Dk)" in reference to a hydrogel (silicone or non-silicone) or a contact lens means a measured oxygen permeability (Dk) which is corrected for the surface resistance to oxygen flux caused by the boundary layer effect according to the procedures shown in Examples hereinafter. Oxygen permeability is conventionally expressed in units of barrers, where "barrer" is defined as $[(cm^3 \text{ oxygen})(mm)/(cm^2)(sec)(mm Hg)] \times 10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3 \text{ oxygen})/(cm^2)(sec)(mm Hg)] \times 10^{-9}$.

A "coupling reaction" in this patent application is intended to describe any reaction between a pair of matching functional groups in the presence or absence of a coupling agent to form covalent bonds or linkages under various reaction conditions well known to a person skilled in the art, such as, for example, oxidation-reduction conditions, dehydration condensation conditions, addition conditions, substitution (or displacement) conditions, Diels-Alder reaction conditions, cationic crosslinking conditions, ring-opening conditions, epoxy hardening conditions, and combinations thereof.

Non-limiting examples of coupling reactions under various reaction conditions between a pair of matching co-reactive functional groups selected from the group preferably consisting of amino group (—NHR' in which R' is H or $C_1$-$C_4$ alkyl), hydroxyl group, carboxyl group, acid halide group (—COX, X=Cl, Br, or I), acid anhydrate group, aldehyde group, azlactone group, isocyanate group, epoxy group, aziridine group, and thiol group, are given below for illustrative purposes. An amino group reacts with aldehyde group to form a Schiff base which may further be reduced; an amino group —NHR' reacts with an acid chloride or bromide group or with an acid anhydride group to form an amide linkage (—CO—NR'— with R' as defined above); an amino group —NHR' reacts with an isocyanate group to form a urea linkage (—NR'—C(O)—NH— with R' as defined above); an amino group —NHR' reacts with an epoxy or aziridine group to form an amine bond (—C—NR'— with R' as defined above); an amino group —NHR' reacts (ring-opening) with an azlactone group to form an alkylene-diamido linkage (—C(O)NH-alkylene-C(O)NR'— with R' as defined above); an amino group —NHR' reacts with a carboxylic acid group in the presence of a coupling agent—carbodiimide (e.g., 1-ethyl-3-(3-dimethylaminopropyl)carbodiimide (EDC), N,N'-dicyclohexylcarbodiimide (DCC), 1-cylcohexyl-3-(2-morpholinoethyl)carbodiimide, diisopropyl carbodiimide, or mixtures thereof) to form an amide linkage; an amino group —NHR' reacts with a N-hydroxysuccinimide ester group to form an amide linkage; a hydroxyl reacts with an isocyanate to form a urethane linkage; a hydroxyl reacts with an epoxy or aziridine to form an ether linkage (—O—); a hydroxyl reacts with an acid chloride or bromide group or with an acid anhydride group to form an ester linkage; an hydroxyl group reacts with an azlactone group in the presence of a catalyst to form an amidoalkylenecarboxy linkage (—C(O)NH-alkylene-C(O)—O—); a carboxyl group reacts with an epoxy group to form an ester bond; a thiol group (—SH) reacts with an isocyanate to form a thiocarbamate linkage (—N—C(O)—S—); a thiol group reacts with an epoxy or aziridine to form a thioether linkage (—S—); a thiol group reacts with an acid chloride or bromide group or with an acid anhydride group to form a thioester linkage; a thiol group reacts with an azlactone group in the presence of a catalyst to form a linkage (—C(O)NH—$CR_3R_4$—$(CH_2)p$-C(O)—S—); a thiol group reacts with a vinyl group based on thiol-ene reaction under thiol-ene reaction conditions to form a thioether linkage (—S—); a thiol group reacts with an acryloyl or methacryloyl group based on Michael Addition under appropriate reaction conditions to form a thioether linkage; an azetidinium group

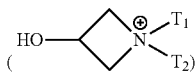

reacts with amino group (—NHR'), a carboxyl, a hydroxyl, or thiol to form a linkage ($T_1T_2N$—CH2-CH(OH)—$CH_2$-E- with E=NR', COO, O, or S) at an temperature of from about 40° C. to 140° C.

It is also understood that coupling agents with two reactive functional groups may be used in the coupling reactions. A coupling agent having two reactive functional groups can be a diisocyanate, a di-acid halide, a di-carboxylic acid compound, a di-acid halide compound, a di-azlactone compound, a di-epoxy compound, a diamine, or a diol. A person skilled in the art knows well to select a coupling reaction (e.g., anyone described above in this application) and conditions thereof to prepare a polysiloxane terminated with one or more ethylenically unsaturated groups. For example, a diisocyanate, di-acid halide, di-carboxylic acid, di-azlactone, or di-epoxy compound can be used in the coupling of two hydroxyl, two amino groups, two carboxyl groups, two epoxy groups, or combination thereof; a diamine or dihydroxyl compound can be used in the coupling of two isocyanate, epoxy, aziridine, carboxylic acid, acid halide or azlactone groups or combinations thereof.

Any suitable $C_4$-$C_{24}$ diisocyanates can be used in the invention. Examples of preferred diisocyanates include without limitation isophorone diisocyanate, hexamethyl-1,6-diisocyanate, 4,4'-dicyclohexylmethane diisocyanate, toluene diisocyanate, 4,4'-diphenyl diisocyanate, 4,4'-diphenylmethane diisocyanate, p-phenylene diisocyanate, 1,4-phenylene 4,4'-diphenyl diisocyanate, 1,3-bis-(4,4'-isocyanto methyl) cyclohexane, cyclohexane diisocyanate, and combinations thereof.

Any suitable diamines can be used in the invention. An organic diamine can be a linear or branched $C_2$-$C_{24}$ aliphatic diamine, a $C_5$-$C_{24}$ cycloaliphatic or aliphatic-cycloaliphatic diamine, or a $C_6$-$C_{24}$ aromatic or alkyl-aromatic diamine. A preferred organic diamine is N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, and isophorone diamine.

Any suitable diacid halides can be used in the invention. Examples of preferred diacid halide include without limitations fumaryl chloride, suberoyl chloride, succinyl chloride, phthaloyl chloride, isophthaloyl chloride, terephthaloyl chloride, sebacoyl chloride, adipoyl chloride, trimethyladipoyl chloride, azelaoyl chloride, dodecanedioic acid chloride, succinic chloride, glutaric chloride, oxalyl chloride, dimer acid chloride, and combinations thereof.

Any suitable di-epoxy compounds can be used in the invention. Examples of preferred di-epoxy compounds are neopentyl glycol diglycidyl ether, 1,4-butanediol diglycidyl ether, 1,6-hexanediol diglycidyl ether, glycerol diglycidyl ether, ethylene glycol diglycidyl ether, diethylene glycol diglycidyl ether, polyethylene glycol diglycidyl ether, propylene glycol diglycidyl ether, dipropylene glycol diglycidyl ether, and combinations thereof. Such di-epoxy compounds are available commercially (e.g., those DENACOL series di-epoxy compounds from Nagase ChemteX Corporation).

Any suitable $C_2$-$C_{24}$ diols (i.e., compounds with two hydroxyl groups) can be used in the invention. Examples of preferred diols include without limitation ethylene glycol, diethylene glycol, triethylene glycol, tetraethylene glycol, polyethylene glycol, propylene glycol, 1,4-butanediol, various pentanediols, various hexanediols, various cyclohexanediols, and combination thereof.

Any suitable $C_3$-$C_{24}$ di-carboxylic acid compounds can be used in the invention. Examples of preferred di-carboxylic acid compounds include without limitation a linear or branched $C_3$-$C_{24}$ aliphatic dicarboxylic acid, a $C_5$-$C_{24}$ cycloaliphatic or aliphatic-cycloaliphatic dicarboxylic acid, a $C_6$-$C_{24}$ aromatic or araliphatic dicarboxylic acid, a dicarboxylic acid which contains amino or imido groups or N-heterocyclic rings, and combinations thereof. Examples of suitable aliphatic dicarboxylic acids are: oxalic acid, malonic acid, succinic acid, glutaric acid, adipic acid, pimelic acid, suberic acid, azelaic acid, sebacic acid, undecanedioic acid, dodecanedioic acid, dimethylmalonic acid, octadecylsuccinic acid, trimethyladipic acid, and dimeric acids (dimerisation products of unsaturated aliphatic carboxylic acids, such as oleic acid). Examples of suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-dicarboxylmethylcyclohexane, 4,4'-dicyclohexyldicarboxylic acid. Examples of suitable aromatic dicarboxylic acids are: terephthalic acid, isophthalic acid, o-phthalic acid, 1,3-, 1,4-, 2,6- or 2,7-naphthalenedicarboxylic acids, 4,4'-diphenyldicarboxylic acid, 4,4'-diphenylsulphone-dicarboxylic acid, 1,1,3-trimethyl-5-carboxyl-3-(p-carboxyphenyl)-indane, 4,4'-diphenyl ether-dicarboxylic acid, bis-p-(carboxylphenyl)-methane.

Any suitable $C_{10}$-$C_{24}$ di-azlactone compounds can be used in the invention. Examples of such diazlactone compounds are those described in U.S. Pat. No. 4,485,236 (herein incorporated by reference in its entirety).

The reactions conditions for the above described coupling reactions are taught in textbooks and are well known to a person skilled in the art.

The term "ethylenically functionize" or ethylenically functionalization" in reference to a compound or polymer or copolymer having one or more reactive functional groups (e.g., amine, hydroxyl, and/or carboxyl groups) means a process or product thereof in which one or more ethylenically unsaturated groups are covalently attached to the functional groups of the compound or polymer or copolymer by reacting an ethylenically functionalizing vinylic monomer with the compound or polymer or copolymer under coupling reaction conditions.

An "ethylenically functionalizing vinylic monomer" throughout of this patent application refers to a vinylic monomer having one reactive functional group capable of participating in a coupling (or crosslinking) reaction known to a person skilled in the art. Preferred examples of ethylenically-functionalizing vinylic monomers include without limitation ene-containing monomers, amino-$C_2$-$C_6$ alkyl (meth)acrylamide, $C_1$-$C_6$ alkylamino-$C_2$-$C_6$ alkyl (meth)acrylamide, (meth)acrylic acid, N,N-2-acrylamidoglycolic acid, (meth)acryloyl halide groups ($CH_2$=CH—COX or $CH_2$=$CCH_3$—COX, X=Cl or Br), N-hydroxysuccinimide ester of (meth)acrylic acid, azlactone-containing vinylic monomers (e.g., 2-vinyl-4,4-dimethyl-1,3-oxazolin-5-one, 2-isopropenyl-4,4-dimethyl-1,3-oxazolin-5-one, 2-vinyl-4- methyl-4-ethyl-1,3-oxazolin-5-one, 2-isopropenyl-4-methyl-4-butyl-1,3-oxazolin-5-one, 2-vinyl-4,4-dibutyl-1,3-oxazolin-5-one, 2-isopropenyl-4-methyl-4-dodecyl-1,3-oxazolin-5-one, 2-isopropenyl-4,4-diphenyl-1,3-oxazolin-5-one, 2-isopropenyl-4,4-pentamethylene-1,3-oxazolin-5-one, 2-isopropenyl-4,4-tetramethylene-1,3-oxazolin-5-one, 2-vinyl-4,4-diethyl-1,3-oxazolin-5-one, 2-vinyl-4-methyl-4-nonyl-1,3-oxazolin-5-one, 2-isopropenyl-4-methyl-4-phenyl-1,3-oxazolin-5-one, 2-isopropenyl-4-methyl-4-benzyl-1,3-oxazolin-5-one, 2-vinyl-4,4-pentamethylene-1,3-oxazolin-5-one, and 2-vinyl-4,4-dimethyl-1,3-oxazolin-6-one, with 2-vinyl-4,4-dimethyl-1,3-oxazolin-5-one (VDMO) and 2-isopropenyl-4,4-dimethyl-1,3-oxazolin-5-one (IPDMO) as preferred azlactone-containing vinylic monomers), and combinations thereof.

Examples of ene-containing monomers include without limitation vinyl-$C_1$-$C_{10}$ alkyl-carboxylic acid, $CH_2$=CH-(alk)$_t$-COOH with t=2 to 0 and alk being a substituted or unsubstituted alkylene (e.g., 3-butenoic acid, 4-pentenoic acid, 5-hexenoic acid, 6-heptenoic acid, 7-octenoic acid, 8-nonenoic acid, 9-decenoic acid); vinyl-$C_1$-$C_{12}$ alkylamines (allylamine, 3-butenylamine, 4-pentenylamine, 1-methyl-4-pentenylamine, 5-hexenylamine, 5-heptenylamine, 6-heptenylamine); N-allyl-$C_1$-$C_{12}$ alkylamines (e.g., N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, N-allyl-1-heptanamine, N-allyl-1-octanamine, N-allyl-1-ecanamine, N-allyl-1-dodecanamine); allyl-$C_1$-$C_{10}$ alkyl alcohols (e.g., allyl alcohol, allylcarbinol, allyethyl alcohol, 5-hexen-1-ol, 5-hexen-2-ol, 9-decen-1-ol); vinyl-$C_1$-$C_{10}$ alkyl halides (e.g., ally bromide, 4-bromo-1-butene, 5-bromo-1-pentene, 6-bromo-1-hexene, 7-bromo-1-heptene, 8-bromo-1-octene, 9-bromo-nonene, 10-bromo-1-decene); vinyl-$C_1$-$C_{10}$ alkyl epoxides (e.g., 3,4-epoxy-1-butene, 3,4-epoxy-1-pentene, 4,5-epoxy-1-pentene, 2-methyl-2-vinyloxirane, 1,2-epoxy-5-hexene, 1,2-epoxy-6-heptene, 1,2-epoxy-7-octene, 1,2-epoxy-8-nonene, 1,2-epoxy-9-decene); and azetidinium-containing ene-containing monomers (e.g., a reaction product of a N-allyl-$C_1$-$C_{12}$ alkylamine with epichlorohydrin).

In general, the invention is directed to a class of actinically-polymerizable amphiphilic polysiloxanes which each comprise a polysiloxane polymer chain having a polysiloxane segments including at least one siloxane unit having a low molecular weight hydrophilic polymer chain connected with a silicone atom of the siloxane unit and (meth)acrylamido groups each covalently bonded to one of the ends of the polysiloxane polymer chain and/or to the end of one of low molecular weight hydrophilic polymer chains each connected with one silicone atom. Further, any polymer chain connecting two (meth)acrylamido groups in an actinically-polymerizable amphiphilic polysiloxane of the invention is, in the backbone of the polymer chain, free of any bond selected from the group consisting of ester bond without a tertiary carbon atom adjacent to the carbonyl group of the ester bond, urethane bond, urea bond, and combination thereof.

There are several potential unique features associated with use of actinically-polymerizable amphiphilic polysiloxanes of the invention in making silicone hydrogel contact lens. First, an actinically-polymerizable amphiphilic polysiloxane of the invention is more compatible with other hydrophilic polymerizable components (e.g., hydrophilic vinylic monomer, hydrophilic crosslinking agent, and/or hydrophilic prepolymer) in a silicone hydrogel contact lens formulation. Second, an actinically-polymerizable amphiphilic polysiloxane of the invention may be used to improve the surface wettability of a silicone hydrogel lens made from a lens forming material including such a polysiloxane. It is known that a silicone hydrogel material typically has a surface or at least some areas of its surface, which is hydrophobic (non-wettable). Hydrophobic surface or surface areas will up-take lipids or proteins from the ocular environment and may adhere to the eye. Thus, a silicone hydrogel contact lens will generally require a surface modification which is typically carried out after cast-molding of the lens. It is believed that because of the presence of pendent hydrophilic polymer chains as substituents on the silicone atoms of siloxane units of a polysiloxane polymer chain, the actinically-polymerizable amphiphilic polysiloxane in a silicone hydrogel lens formulation may be adsorbed at the interface between the mold and the prepolymer solution. Where the pendent hydrophilic polymer chains are sufficiently present in the silicone hydrogel lens formulation, an interfacial films, which is composed essentially of pendant hydrophilic polymer chains and has adequate thickness, can be formed at the mold-solution interface prior to curing (polymerization) and subsequently preserved after curing. Third, an actinically-polymerizable amphiphilic polysiloxane of the invention is more suitable for a UV-polymerization process requiring a short curing time (e.g., within a time period of about 50 seconds or less), because of the presence of (meth)acrylamido groups. Fourth, by using an actinically-polymerizable amphiphilic polysiloxane of the invention in a silicone hydrogel lens formulation, silicone hydrogel contact lenses obtained from the lens formulation can have superior lens stability, because of stable backbones of the polysiloxane polymer chains and the hydrophilic polymer chains as substituents of silicone atoms of siloxane units. An acinically-polymerizable amphiphilic polysiloxane of the invention is designed to have stable backbones free of unstable bonds (such as, ester bond without a tertiary carbon atom adjacent to the carbonyl group of the ester bond, urea bond, urethane bond, ether bond) which are susceptible of cleavage due to hydrolysis, photolysis, poor thermal stability, and/or oxidation.

The present invention, in one aspect, provides an actinically polymerizable amphiphilic polysiloxane. The amphiphilic polysiloxane of the invention comprises: (1) a polysiloxane polymer chain comprising a polylsiloxane segments comprising at least one siloxane unit having a low molecular weight hydrophilic polymer chain connected with a silicone atom of the siloxane unit; and (2) two or more (meth)acrylamido groups each covalently bonded to one of the ends of the polysiloxane polymer chain and/or to the end of one of low molecular weight hydrophilic polymer chains each connected with one silicone atom, wherein any polymer chain connecting two (meth)acrylamido groups in the actinically polymerizable amphiphilic polysiloxane is, in the backbone of said polymer chain, free of any bond selected from the group consisting of ester bond without a tertiary carbon atom adjacent to the carbonyl group of the ester bond, urethane bond, urea bond, and combination thereof.

In accordance with the invention, the actinically polymerizable amphiphilic polysiloxane is preferably defined by formula (1) or (2)

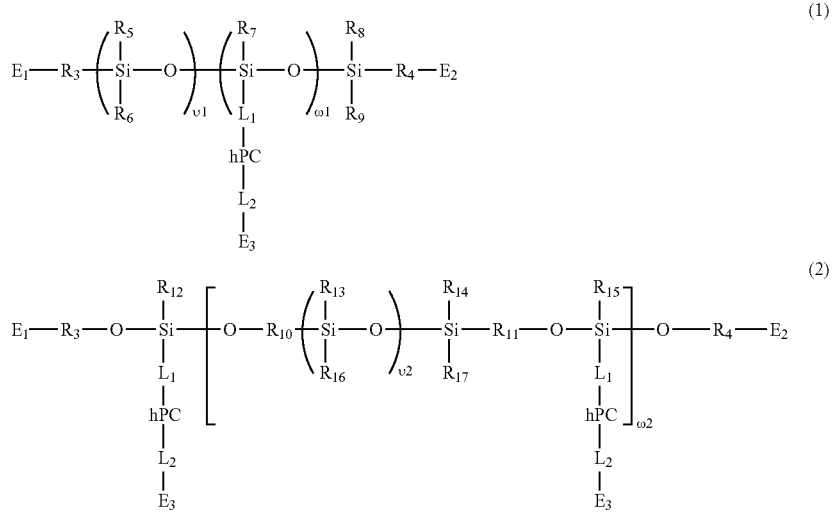

in which:
v1, v2, and ω1 independently of one another are an integer of from 1 to 500;
ω2 independent of each other are an integer of from 1 to 10;
$R_3$ and $R_4$, independently of each other, are a direct bond or a substituted or unsubstituted $C_1$-$C_{10}$ alkylene divalent radical;
$R_{10}$ and $R_{11}$, independently of each other, are a substituted or unsubstituted $C_1$-$C_{10}$ alkylene divalent radical;
$R_5$, $R_6$, $R_7$, $R_8$, $R_9$, $R_{12}$, $R_{13}$, $R_{14}$, $R_{15}$, $R_{16}$, and $R_{17}$, independently of one another, are $C_1$-$C_8$-alkyl, $C_1$-$C_4$ alkyl- or $C_1$-$C_4$ alkoxy-substituted phenyl, or fluoro-substituted $C_1$-$C_{18}$-alkyl, (but preferably are methyl);
$L_1$ is a divalent radical of

—(CH$_2$)$_2$—R$_{18}$—X$_1$—R$_{18}'$— in which $R_{18}$ is a substituted or unsubstituted $C_1$-$C_{10}$ alkylene divalent radical and $R_{18}'$ is a direct bond or a substituted or unsubstituted $C_1$-$C_{10}$ alkylene divalent radical, $X_1$ is a direct bond, a thio ether bond (—S—), —NR$_{20}$— in which $R_{20}$ is a substituted or unsubstituted $C_1$-$C_{10}$ alkyl, or a divalent radical of

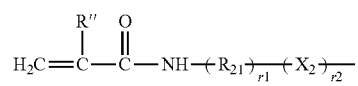

in which $R_{19}$ is a substituted or unsubstituted $C_1$-$C_{10}$ alkylene divalent radical and $R_{20}$ is a substituted or unsubstituted $C_1$-$C_{10}$ alkyl; $L_2$ is a direct bond or a substituted or unsubstituted $C_1$-$C_{10}$ alkylene divalent radical; $E_1$, $E_2$ and $E_3$, independent of one another, are hydrogen, substituted or unsubstituted $C_1$-$C_8$-alkyl, $C_1$-$C_8$-alkoxy, —NH$_2$, —NHR' with R' being $C_1$-$C_{10}$ alkyl, hydroxyl, carboxyl, halogen atom (Br or Cl), thiol, or a polymerizable group which is

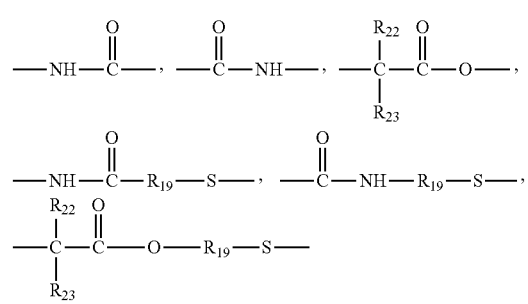

in which r1 and r2 independent of each other are integer of 0 or 1, R'' is hydrogen or methyl, $R_{21}$ is a substituted or unsubstituted $C_1$-$C_{10}$ alkylene divalent radical, $X_2$ is in which $R_{22}$ and $R_{23}$ independent of each other are $C_1$-$C_8$ alkyl (preferably methy), and $R_{19}$ is a substituted or unsubstituted $C_1$-$C_{10}$ alkylene divalent radical, provided that either $E_1$ and $E_2$ both are a polymerizable group or $E_3$ is a polymerizable group; and hPC is a hydrophilic polymer segment selected from the group consisting of (1) polyoxazoline segment

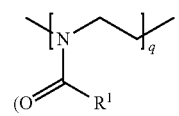

in which $R^1$ is hydrogen, methyl or ethyl group, and q is an integer from 3 to 500) which is obtained in a ring-opening polymerization of oxazoline, (2) a polypeptide segment composed of at least one amino acid selected from the group consisting of asparagine, glutamine, alanine, glycine, and combinations thereof, and (3) a hydrophilic polymer segment composed of hydrophilic monomeric units derived from at least one hydrophilic vinylic monomer selected from the group consisting of (meth)acrylamide, N,N-dimethyl (meth)acrylamide, dimethylaminoethyl (meth)acrylate, dimethylaminoethyl (meth)acrylamide, N-vinyl-2-pyrrolidone, N-vinyl-N-methyl isopropylamide, N-vinyl-N-methyl acetamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and mixtures thereof (preferably selected from the group consisting of N-vinylpyrrolidone, N,N-dimethyl (meth)acrylamide, (meth)acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof).

In one set of preferred embodiments, an actinically polymerizable amphiphilic polysiloxane of the invention is defined by formula (1) in which: (a) $E_1$ and $E_2$ are an polymerizable group as defined above while $E_3$ is hydrogen, substituted or unsubstituted $C_1$-$C_8$-alkyl, $C_1$-$C_8$-alkoxy, —$NH_2$, —NHR' with R' being $C_1$-$C_{10}$ alkyl, hydroxyl, carboxyl, halogen atom (Br or Cl), thiol; (b) $E_1$ and $E_2$ are hydrogen, substituted or unsubstituted $C_1$-$C_8$-alkyl, $C_1$-$C_8$-alkoxy, —$NH_2$, —NHR' with R' being $C_1$-$C_{10}$ alkyl, hydroxyl, carboxyl, halogen atom (Br or Cl), thiol while $E_3$ is an polymerizable group as defined above; (c) $E_1$, $E_2$ and $E_3$ are an polymerizable group as defined above; (d) $R_5$, $R_6$, $R_7$, $R_8$, and $R_9$ are methyl; (e) v1 and ω1 independently of each other are an integer of from 3 to 350, preferably from 5 to 200, more preferably from 10 to 150; (f) v1:ω1 is from about 7:3 to about 9.5:0.5; (g) hPC is a hydrophilic polymer segment selected from the group consisting of a polyoxazoline segment, a hydrophilic polymer segment composed of hydrophilic monomeric units derived from at least one hydrophilic vinylic monomer selected from the group consisting of N-vinylpyrrolidone, N,N-dimethyl (meth)acrylamide, (meth)acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof, and combinations thereof; or (h) a combination of two or more of (a)-(g).

In another set of preferred embodiments, an actinically polymerizable amphiphilic polysiloxane of the invention is defined by formula (2) in which: (a) $E_1$ and $E_2$ are an polymerizable group as defined above while $E_3$ is hydrogen, substituted or unsubstituted $C_1$-$C_8$-alkyl, $C_1$-$C_8$-alkoxy, —$NH_2$, —NHR' with R' being $C_1$-$C_{10}$ alkyl, hydroxyl, carboxyl, halogen atom (Br or Cl), thiol; (b) $E_1$ and $E_2$ are hydrogen, substituted or unsubstituted $C_1$-$C_8$-alkyl, $C_1$-$C_8$-alkoxy, —$NH_2$, —NHR' with R' being $C_1$-$C_{10}$ alkyl, hydroxyl, carboxyl, halogen atom (Br or Cl), thiol while $E_3$ is an polymerizable group as defined above; (c) $E_1$, $E_2$ and $E_3$ are an polymerizable group as defined above; (d) $R_{12}$, $R_{13}$, $R_{14}$, $R_{15}$, $R_{16}$, and $R_{17}$ are methyl; (e) v2 is an integer of an integer of from 3 to 350 (preferably from 5 to 200, more preferably from 10 to 150) while ω2 is an integer of from 1 to 10; (f) hPC is a hydrophilic polymer segment selected from the group consisting of a polyoxazoline segment, a hydrophilic polymer segment composed of hydrophilic monomeric units derived from at least one hydrophilic vinylic monomer selected from the group consisting of N-vinylpyrrolidone, N,N-dimethyl (meth)acrylamide, (meth)acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof, and combinations thereof; or (g) a combination of two or more of (a)-(f).

An actinically polymerizable amphiphilic polysiloxane of the invention can be prepared according to the following illustrative methods or the likes.

An actinically polymerizable amphiphilic polysiloxane of formula (1) can be prepared by reacting a linear mono-ene functional hydrophilic polymer (i.e., having one sole terminal ene group and as being represented by the formula of $CH_2=CH-R_{18}-X_1-R_{18}'-hPC-L_2-E_3$ in which $R_{18}$, $X_1$, $R_{18}'$, hPC, $L_2$, and $E_3$ are as defined above) with a hydrosiloxane-containing polysiloxane of formula (3)

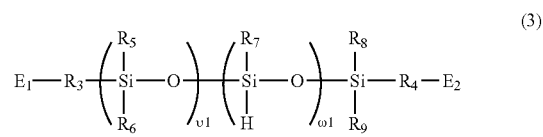

(3)

in which $R_3$, $R_4$, $R_5$, $R_6$, $R_7$, $R_8$, $R_9$, $E_1$, $E_2$, v1, and ω1 are as defined above, in a platinum-catalyzed hydrosilylation reaction as known to a person skilled in the art.

Hydrosiloxane-containing polysiloxane of formula (3) in which $E_1$ and $E_2$ are hydrogen or alkoxy can be obtained directly from commercial sources (e.g., Gelest, ShinEtsu Chemicals, etc.), or alternatively be prepared according to any methods known to a person skilled in the art. As an illustrative example, a trimethylsiloxy-terminated dimethylsiloxane-methylhydrosiloxane copolymer (i.e., a hydrosiloxane-containing polysiloxane of formula (3) in which $E_1$ and $E_2$ are hydrogen and $R_3$ to $R_9$ are methyl) can be prepared from polymerization of a mixture of octamethylcyclotetrasiloxane (D4) and 1,3,5,7-tetramethylcyclotetrasiloxane (H4) in presence of hexamethyldisiloxane as a chain end block and in the presence of a catalyst. By controlling the molar ratio of D4 to H4, a desired value of v1:ω1 can be obtained.

Similarly, hydrosiloxane-containing polysiloxane of formula (3) in which $E_1$ and $E_2$ are a polymeriable group

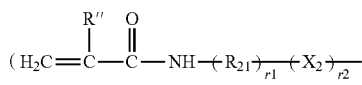

in which R″, $R_{21}$, $X_2$, r1 and r2 are as defined above) can be prepared from polymerization of a mixture of octamethylcyclotetrasiloxane (D4) and 1,3,5,7-tetramethylcyclotetrasiloxane (H4) in presence of a disiloxane of formula (4) as a chain end block

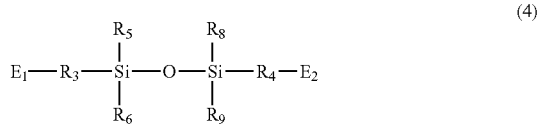

In which $E_1$, $E_2$, $R_3$, $R_4$, $R_5$, $R_6$, $R_8$ and $R_9$ are as defined above, and in the presence of a catalyst, with a desired molar ratio of D4 to H4. A disiloxane of formula (4) can be obtained by ethylenically functionalizing of a disiloxane having two substituent containing a reactive functional group (e.g., a di-aminoalkyl-tetraalkyl-disiloxane, a di-alkylaminoalkyl-tetraalkyl-disiloxane, a di-carboxyalkyl-tetraalkyl-disiloxane, or a di-hydroxyalkyl-tetraalkyl-disiloxane) with an ethylenically functionalizing vinyl monomer (e.g., amino-$C_2$-$C_6$ alkyl (meth)acrylamide, $C_1$-$C_6$ alkylamino-$C_2$-$C_6$ alkyl (meth)acrylamide, (meth)acrylic acid, N,N-2-acrylamidoglycolic acid, (meth)acryloyl halide groups ($CH_2$=CH—COX or $CH_2$=$CCH_3$—COX, X=Cl or Br), N-hydroxysuccinimide ester of (meth)acrylic acid, an azlactone-containing vinylic monomer (any one of those described above)).

A linear mono-ene functional hydrophilic polymer of formula (5)

$$CH_2=CH-R_{18}-X_1-R_{18}'-hPC-L_2-E_3 \quad (5)$$

in which $R_{18}$, $X_1$, $R_{18}'$, hPC, $L_2$, and $E_3$ are as defined above, can be prepared according to any methods known to a person skilled in the art.

For example, where hPC in formula (5) is a polyoxazoline segment, a hydrophilic polymer of formula (5) can be prepared by ring opening polymerization of oxazoline initiated by a halogen (Br or Cl)-containing vinyl monomer (e.g., allyl bromide, 4-bromo-1-butene, 5-bromo-1-pentene, 6-bromo-1-hexene, 7-bromo-1-heptene, 8-bromo-1-octene, 9-bromo-nonene, 10-bromo-1-decene) and terminated with hydroxide, alcohol, thiol (optionally containing hydroxyl, carboxyl or amine group), or amine, in the presence of a catalyst and under conditions known to a person skilled in the art.

A linear mono-ene functional hydrophilic polymer of formula (5) can also be prepared by first obtaining a monofunctional or hetero-bifunctional polyoxazoline and then ethylenically functionalizing the resultant monofunctional or hetero-bifunctional polyoxazoline with an ene-containing monomer of formula (6)

$$CH_2=CH-R_{18}-Z_1 \quad (6)$$

in which $R_{18}$ is a substituted or unsubstituted $C_1$-$C_{10}$ alkylene divalent radical and $Z_1$ is a functional group selected from the group consisting of hydroxyl, carboxyl, —$NH_2$, $C_1$-$C_{12}$ alkylamino, epoxy, halogen (Br or Cl), and azetidinium group. A person skilled in the art knows well how to select an ene-containing monomer of formula (6) based on the different reactivities of the two different functional groups of a hetero-bifunctional poloxazoline.

Examples of ene-containing monomer of formula (6) include without limitation allylamine, 3-butenylamine, 4-pentenylamine, 1-methyl-4-pentenylamine, 5-hexenylamine, 5-heptenylamine, 6-heptenylamine, allyl alcohol, allylcarbinol, allyethyl alcohol, 5-hexen-1-ol, 5-hexen-2-ol, 9-decen-1-ol, ally bromide, 4-bromo-1-butene, 5-bromo-1-pentene, 6-bromo-1-hexene, 7-bromo-1-heptene, 8-bromo-1-octene, 9-bromo-nonene, 10-bromo-1-decene, 3,4-epoxy-1-butene (2-vinyloxirane), 3,4-epoxy-1-pentene, 4,5-epoxy-1-pentene, 2-methyl-2-vinyloxirane, 1,2-epoxy-5-hexene, 1,2-epoxy-6-heptene, 1,2-epoxy-7-octene, 1,2-epoxy-8-nonene, 1,2-epoxy-9-decene, N-ethyl-2-methylallylamine, N-ethylallylamine, N-allylmethylamine, N-allyl-1-pentanamine, N-allyl-2-methyl-1-pentanamine, N-Allyl-2,3-dimethyl-1-pentanamine, N-allyl-1-hexanamine, N-allyl-2-methyl-1-hexanamine, N-allyl-1-heptanamine, N-allyl-1-octanamine, N-allyl-1-ecanamine, N-allyl-1-dodecanamine, 3-butenoic acid, 4-pentenoic acid, 5-hexenoic acid, 6-heptenoic acid, 7-octenoic acid, 8-nonenoic acid, 9-decenoic acid), and a reaction product (i.e., an azetidinium-containing ene-containing monomer) of N-allyl-$C_1$-$C_{12}$ alkanamine with epichlorohydrin.

As an illustrative example for preparing a linear mono-ene functional hydrophilic polymer of formula (5), oxazoline polymerization is initiated with ethyl 3-bromopropionate and terminated with hydroxide, alcohol, thiol, or amine, to obtain a monofunctional or hetero-bifunctional polyoxazoline comprising one carboxyl group, which is in turn reacted with an amino-containing and ene-containing monomer (e.g., allylamine, 3-butenylamine, 4-pentenylamine, 1-methyl-4-pentenylamine, 5-hexenylamine, 5-heptenylamine, 6-heptenylamine, N-ethyl-2-methylallylamine, N-ethylallylamine, N-allylmethylamine, N-allyl-1-pentanamine, N-allyl-2-methyl-1-pentanamine, N-allyl-2,3-dimethyl-1-pentanamine, N-allyl-1-hexanamine, N-allyl-2-methyl-1-hexanamine, N-allyl-1-heptanamine, N-allyl-1-octanamine, N-allyl-1-ecanamine, N-allyl-1-dodecanamine) to obtain a linear mono-ene functional hydrophilic polymer of formula (5).

Where hPC in formula (5) is a polypeptide segment, a linear mono-ene functional hydrophilic polymer of formula (5) can be prepared from a polypeptide composed of at least one amino acid selected from the group consisting of asparagine, glutamine, alanine, glycine, and combinations thereof by reacting one of a carboxyl-containing ene-containing monomer with the amino group at the N-terminal of the polypeptide by reacting an amino-containing ene-containing monomer with the carboxyl group at the C-terminal of the polypeptide, in the presence of 1-ethyl-3-(3-dimethylaminopropyl)carbodiimide (EDC) and N-hydroxysuccinimide (HO—NHS).

Where hPC in formula (5) is a hydrophilic polymer segment composed of hydrophilic monomeric units derived from at least one hydrophilic vinyl monomer selected from the group consisting of (meth)acrylamide, N,N-dimethyl (meth)acrylamide, dimethylaminoethyl (meth)acrylate, dimethylaminoethyl (meth)acrylamide, N-vinyl-2-pyrrolidone, N-vinyl-N-methyl isopropylamide, N-vinyl-N-methyl acetamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and mixtures thereof, a linear mono-ene functional hydrophilic polymer of formula (5) can be prepared by atom-transfer-radical-polymerization (ATRP) of one or more hydrophilic vinylic monomers using an ene-containing ATRP initiator in the presence of a catalyst (e.g., cuprous halide—CuBr). A resultant hydrophilic polymer is terminated with one ene group and one bromide group, the bromide group which can react with a reactive functional group (e.g., with hydroxy to form an ether bond, with acid to form an ester bond, with amino group to form an amino bond) or can be converted into an amino group or other reactive functional group as known to a person skilled in the art. Ene-containing ATRP initiators can be prepared by reacting α-bromoisobutyryl bromide or 2-bromo-2-methyl-propionic acid with an ene-containing monomer of formula (6).

Alternative, where hPC in formula (5) is a hydrophilic polymer segment composed of hydrophilic monomeric units derived from at least one hydrophilic vinylic monomer selected from the group consisting of (meth)acrylamide, N,N-dimethyl (meth)acrylamide, dimethylaminoethyl (meth)acrylate, dimethylaminoethyl (meth)acrylamide, N-vinyl-2-pyrrolidone, N-vinyl-N-methyl isopropylamide, N-vinyl-N-methyl acetamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and mixtures thereof, a linear mono-ene functional hydrophilic polymer of formula (5) can be prepared by reacting an ene-containing monomer of formula (6) with a monofunctional linear hydrophilic polymer (i.e., having one sole terminal functional group) or a hetero-bifunctional linear hydrophilic polymer (i.e., have two different terminal functional groups). Monofunctional or hetero-bifunctional hydrophilic polymer can be prepared according various known methods. For example, a monofunctional hydrophilic polymer can be prepared by free-radical polymerization of one or more hydrophilic vinylic monomers in the presence of a chain transfer agent having a carboxyl or amino group (i.e., a mercaptan with amino or carboxyl group, such as, 2-aminoethanethiol, 2-mercapto-propinic acid, thioglycolic acid, thiolactic acid, etc.), by reversible addition fragmentation transfer (RAFT) polymerization of one or more hydrophilic polymer using a RAFT agent (e.g., dithiocarbamates, xanthates, dithioesters, trithiocarbonates from a commercial sources, e.g., SIGMA-ALDRICH) and subsequent hydrolysis to yield a terminal thiol group which can optionally be converted into carboxyl or amino group by reacting with an ene-containing monomer of formula (6) according to thiol-ene reaction, or by ATRP polymerization of one or more hydrophilic vinylic monomers using an ATRP agent free of functional group (e.g., ethyl α-bromoisobutyrate).

A hetero-bifunctional hydrophilic polymer can be prepared by carrying out reversible addition fragmentation transfer (RAFT) polymerization of one or more hydrophilic polymer using a RDFT agent having a functional group (e.g., carboxyl or amino group) and then reducing the trithiocarbonate group into thiol groups.

In another approach, an actinically polymerizable amphiphilic polysiloxane of formula (1) can be prepared in a two-step process. In the first step, a hydrosiloxane-containing polysiloxane of formula (3) (as defined above) is reacted with an ene-containing vinylic monomer of formula (6) (as defined above) to obtain a polysiloxane of formula (7)

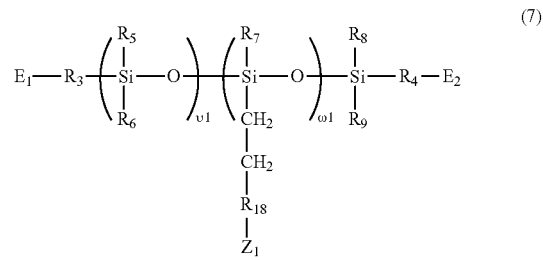

in which $R_3$, $R_4$, $R_5$, $R_6$, $R_7$, $R_8$, $R_9$, $R_{18}$, $Z_1$, $E_1$, $E_2$, $\nu_1$, and $\omega_1$ are as defined above. In the second step, a polysiloxane of formula (7) is reacted with a monofunctional linear hydrophilic polymer or with a hetero-bifunctional linear hydrophilic polymer to obtain an anctinically polymerizable amphiphilic polysiloxane of formula (1). Where a hetero-bifunctional linear hydrophilic polymer is used, the obtained amphiphilic polysiloxane of formula (1) can be further reacted with an ethylenically unsaturated vinylic monomer to convert the unreacted terminal functional group into a polymerizable group.

An actinically-polymerizable amphiphilic polysiloxane of formula (2) can be prepared in a three-step process. In the first step, a hydrophilic polymer with one sole dimethoxy-alkylsilane group

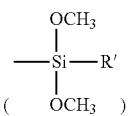

is prepared. The hydrophilic polymer is prepared using conventional radical polymerization in the presence of thiol silane as the chain transfer agent. The chain transfer agent not only allows controlling the molecular weight of the polymer but also provides the dimethoxysilane groups for further chain extension in the second step. In the second step, condensation reaction between a, w-dihydroxy poly (dialkylsiloxane) (PDMS) and the hydrophilic polymer obtained in step 1. In the third step, a hydroxyalkyl (meth) acrylamide (e.g., hydroxyethylacrylamide) is reacted with with the terminal methoxysilanes to introduce crosslinkable acrylamide groups. By controlling the ratio of dimethoxysilane to OH, an actinically-polymerizable amphiphilic polysiloxane of formula (2) can be prepared. PDMS segment molecular weight ranges from 1,000 to 20,000 g/mol. The hydrophilic polymer MW ranges from 500 to 5,000 g/mol.

An actinically-polymerizable amphiphilic polysiloxane of the invention (formula (1) or (2) as defined above) can find particular use in preparing a polymer, preferably a silicone-containing actinically-crosslinkable prepolymer or a silicone hydrogel polymeric material, which is another aspect of the invention. A person skilled in the art knows how to prepare a polymer, an actinically-crosslinkable silicone containing prepolymer, or a silicone hydrogel polymeric material from a polymerizable composition according to any known polymerization mechanism.

In this aspect of the invention, a polymer can be a copolymer soluble or insoluble in a solvent, preferably an actinically-crosslinkable prepolymer or a silicone hydrogel material.

Various embodiments of actinically-polymerizable amphiphilic polysiloxane of the invention formula (1) or (2) (as defined above) can be used in a polymerizable composition for preparing a polymer, a prepolymer or a silicone hydrogel material of the invention.

A person skilled in the art knows how to prepare a polymer, an actinically-crosslinkable silicone-containing prepolymer, or a silicone hydrogel material from a polymerizable composition according to any known free-radical polymerization mechanism. The polymerizable composition for preparing a polymer, an intermediary copolymer for preparing an actinically-crosslinkable silicone containing prepolymer, or a silicone hydrogel polymeric material of the invention can be a melt, a solventless liquid in which all necessary components are blended together, or a solution in which all necessary component is dissolved in an inert solvent, such as water, an organic solvent, or mixture thereof, as known to a person skilled in the art.

Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

The copolymerization of a polymerizable composition for preparing a polymer, an actinically-crosslinkable silicone containing prepolymer (i.e., an intermediary copolymer for the prepolymer), or a silicone hydrogel polymeric material of the invention may be induced photochemically or thermally.

Suitable photoinitiators are benzoin methyl ether, diethoxyacetophenone, a benzoylphosphine oxide, 1-hydroxycyclohexyl phenyl ketone and Darocur and Irgacure types, preferably Darocur 1173®, Irgacure 369®, Irgacure 379®, and Irgacure 2959®. Examples of benzoylphosphine oxide initiators include 2,4,6-trimethylbenzoyldiphenylophosphine oxide (TPO); bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Suitable thermal polymerization initiators are known to the skilled artisan and comprise, for example peroxides, hydroperoxides, azo-bis(alkyl- or cycloalkylnitriles), persulfates, percarbonates or mixtures thereof. Examples are benzoylperoxide, tert.-butyl peroxide, di-tert.-butyl-diperoxyphthalate, tert.-butyl hydroperoxide, azo-bis(isobutyronitrile) (AIBN), 1,1-azodiisobutyramidine, 1,1'-azo-bis(1-cyclohexanecarbonitrile), 2,2'-azo-bis(2,4-dimethyl-valeronitrile) and the like. The polymerization is carried out conveniently in an above-mentioned solvent at elevated temperature, for example at a temperature of from 25 to 100° C. and preferably 40 to 80° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

Generally, a polymer of the invention is obtained by polymerizing thermally or actinically a polymerizable composition including an actinically-polymerizable amphiphilic polysiloxane of formula (1) or (2) as defined above and one or more polymerizable components selected from the group consisting of a hydrophilic vinylic monomer, a hydrophobic vinylic monomer, a siloxane-containing vinylic monomer, a non-silicone crosslinker, a UV-absorbing vinylic monomer, and combinations thereof. Various embodiments of all of the above-described polymerizable components are discussed below.

In accordance with the invention, any suitable hydrophilic vinylic monomers can be used in a polymerizable composition for preparing a polymer of the invention. Examples of preferred hydrophilic vinylic monomers include without limitation N-vinylpyrrolidone, N,N-dimethyl (meth)acrylamide, (meth)acrylamide, hydroxylethyl (meth)acrylamide, hydroxyethyl (meth)acrylate, glycerol methacrylate (GMA), polyethylene glycol (meth)acrylate, polyethylene glycol $C_1$-$C_4$-alkyl ether (meth)acrylate having a weight average molecular weight of up to 1500, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, (meth)acrylic acid, ethylacrylic acid, and combinations thereof.

Any suitable hydrophobic vinylic monomers can be used in a polymerizable composition for making a polymer of the invention. By incorporating a certain amount of hydrophobic vinylic monomer in a monomer mixture, the mechanical properties (e.g., modulus of elasticity) of the resultant polymer may be improved. Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Any suitable siloxane-containing vinylic monomers can be used in the invention. Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl]acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silylcarbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl]propyl allyl carbamate, 3-[tris(trimethylsiloxy)silyl]propyl vinyl carbonate, t-butyldimethyl-siloxyethyl vinyl carbonate, trimethylsilylethyl vinyl carbonate, trimethylsilylmethyl vinyl carbonate, and hydrophilized siloxane-containing vinylic monomers disclosed in U.S. patent application Nos. 61/737,206, 61/737218, and 61/737181 (herein incorporated by references in their entireties) which comprise at least one hydrophilic linkage and/or at least one hydrophilic chain.

Any suitable non-silicone crosslinkers can be used in a polymerizable composition for preparing a polymer of the invention. Examples of preferred non-silicone crosslinkers include without limitation tetraethyleneglycol di-(meth)acrylate, triethyleneglycol di-(meth)acrylate, ethyleneglycol di-(meth)acrylate, diethyleneglycol di-(meth)acrylate, bisphenol A dimethacrylate, vinyl methacrylate, ethylenediamine di(meth)acrylamide, glycerol dimethacrylate, allyl (meth)acrylate, N,N'-methylenebis(meth)acrylamide, N,N'-ethylenebis(meth)acrylamide, N,N'-dihydroxyethylene bis(meth)acrylamide, a product of diamine (preferably selected from the group consisting of N,N'-bis(hydroxyethyl)ethylenediamine, N,N'-dimethylethylenediamine, ethylenediamine, N,N'-dimethyl-1,3-propanediamine, N,N'-diethyl-1,3-propanediamine, propane-1,3-diamine, butane-1,4-diamine, pentane-1,5-diamine, hexamethylenediamine, isophorone diamine, and combinations thereof) and epoxy-containing vinylic monomer (preferably selected from the group consisting of glycidyl (meth)acrylate, vinyl glycidyl ether, allyl glycidyl ether, and combinations thereof), combinations thereof. A more preferred crosslinker to be used in the preparation of a polymer, an actinically-crosslinkable silicone containing prepolymer, or a silicone hydrogel polymeric material of the invention is a hydrophilic crosslinker selected from the group consisting of tetra(ethyleneglycol) diacrylate, tri(ethyleneglycol) diacrylate, ethyleneglycol diacrylate, di(ethyleneglycol) diacrylate, glycerol dimethacrylate, allyl(meth)acrylate, N,N'-methylene bis(meth)acrylamide, N,N'-ethylene bis(meth)acrylamide, N,N'-dihydroxyethylene bis(meth)acrylamide, and combinations thereof.

Any suitable UV-absorbing vinylic monomers can be used in a polymerizable composition for preparing a polymer of the invention. Preferred UV absorbing vinylic monomers include without limitation 2-(2-hydroxy-5-vinylphenyl)-2H-benzotriazole, 2-(2-hydroxy-5-acryloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'-methacryloxyethylphenyl)benzotriazole, 2-(2'-hydroxy-5'-methacryloxypropylphenyl)benzotriazole, 2-hydroxy-4-acryloxy alkoxy benzophenone, 2-hydroxy-4-methacryloxy alkoxy benzophenone, allyl-2-hydroxybenzophenone, 2-hydroxy-4-methacryloxy benzophenone. In accordance with the invention, the polymerizable composition comprises about 0.2% to about 5.0%, preferably about 0.3% to about 2.5%, more preferably about 0.5% to about 1.8%, by weight of a UV-absorbing vinylic monomer.

In a preferred embodiment, a polymer of the invention is a silicone-containing actinically-crosslinkable prepolymer, which preferably comprises: (1) crosslinking units derived from at least one actinically-polymerizable amphiphilic polysiloxane of formula (1) or (2) (preferably formula (1)); (2) hydrophilic units derived from at least one hydrophilic vinylic monomer as described above; (3) polymerizable units derived from a chain transfer agent having a first reactive functional group other than thiol group and/or a vinylic monomer having a second reactive functional group other than ethylenically-unsaturated group, wherein the polymerizable units each comprise an ethylenically unsaturated group covalently attached to one polymerizable unit through the first or second reactive functional group; (4) optionally non-silicone crosslinking units derived from at least one non-silicone crosslinker as described above (preferably a non-silicone, hydrophilic crosslinker as described above); and (5) optionally UV-absorbing units derived from a UV-absorbing vinylic monomer as described above. Such a prepolymer is capable of being actinically crosslinked, in the absence of one or more vinylic monomers, to form a silicone hydrogel contact lens having a water content of from about 20% to about 75% (preferably from about 25% to about 70%, more preferably from about 30% to about 65%) by weight when fully hydrated, and an oxygen permeability (Dk) of at least about 40 barrers (preferably at least about 50 barrers, more preferably at least about 60 barrers, and even more preferably at least about 70 barrers). Preferably, such a prepolymer is water soluble or processable. a non-silicone crosslinker as described above Such a prepolymer is obtained by first polymerizing a polymerizable composition including all polymerizable components specified above, to form an intermediary copolymer and then by ethylenically functionalizing the intermediary copolymer with an ethylenically functionalizing vinylic monomer having a third reactive functional group capable of reacting with the first and/or second reactive functional group to form a linkage in a coupling reaction in the presence or absence of a coupling agent to form the prepolymer, wherein the first, second and third reactive functional groups independent of one another are selected from the group consisting of amino group, hydroxyl group, carboxyl group, acid halide group, azlactone group, isocyanate group, epoxy group, aziridine group, and combination thereof. The general procedures for preparing amphiphilic prepolymers are disclosed in U.S. Pat. Nos. 6,039,913, 6,043,328, 7,091,283, 7,268,189 and 7,238,750, 7,521,519, 8,071,703, 8,044,111, and 8,048,968; in US patent application publication Nos. US 2008-0015315 A1, US 2008-0143958 A1, US 2008-0143003 A1, US 2008-0234457 A1, US 2008-0231798 A1, 2010/0120939 A1, 2010/0298446 A1, 2012/0088843 A1, 2012/0088844 A1, and 2012/0088861 A1; all of which are incorporated herein by references in their entireties.

In accordance with the invention, the polymerizable units each comprise a basic monomeric unit being a part of a polymer chain of the prepolymer and a pendant or terminal, ethylenically-unsaturated group attached thereon, wherein each basic monomeric unit is derived from a first ethylenically functionalizing vinylic monomer having a second reactive functional group, wherein the pendant or terminal ethylenically unsaturated group is derived from a second ethylenically functionalizing vinylic monomer having a third reactive functional group which reacts with one second reactive functional in the presence or absence of a coupling agent to form a covalent linkage. The second and third reactive functional groups are selected from the group consisting of amino group, hydroxyl group, carboxyl group, azlactone group, isocyanate group, epoxy group, aziridine group, acid chloride, and combination thereof. Examples of such vinylic monomers are those ethylenically functionalizing vinylic monomers described above. Preferably, the first ethylenically functionalizing vinylic monomer is selected from the group consisting of hydroxyethyl (meth)acrylate, hydroxypropyl (meth)acrylate, hydroxyethyl (meth)acrylamide, hydroxypropyl (meth)acrylamide, allyl alcohol, aminoethyl (meth)acrylate, aminopropyl (meth)acrylate, aminoethyl (meth)acrylamide, aminopropyl (meth)acrylamide, allyl amine, (meth)acrylic acid, ethylacrylic acid, propylacrylic acid, butylacrylic acid, glycidyl (meth)acrylate, vinyl glycidyl ether, allyl glycidyl ether, isocynatoethyl (meth)acrylate, 2-(1-aziridinyl)ethyl(meth)acrylate, 3-(1-aziridinyl)propyl(meth)acrylate, 4-(1-aziridinyl)butyl(meth)acrylate, 2-vinyl-4,4-dimethyl-1,3-oxazolin-5-one (VDMO), 2-isopropenyl-4,4-dimethyl-1,3-oxazolin-5-one (IPDMO), and combination thereof. Most preferably, the first ethylenically functionalizing vinylic monomer is selected from the group consisting of hydroxyethyl (meth)acrylate, hydroxypropyl (meth)acrylate, hydroxyethyl (meth)acrylamide, hydroxypropyl (meth)acrylamide, allyl alcohol, aminoethyl (meth)acrylate, aminopropyl (meth)acrylate, aminoethyl (meth)acrylamide, aminopropyl (meth)acrylamide, allyl amine, and combinations thereof.

In accordance with the invention, the content of the polymerizable units are determined based on weight percentage of the ethylenically functionalizing vinylic monomer present in the polymerizable composition for making an water-processable intermediary copolymer relative to the total weight of polymerizable components in the polymerizable composition or the weight percentage of the ethylenically functionalizing vinylic monomer used in ethylenically functionalizing the intermediary copolymer to form the prepolymer of the invention, relative to the weight of the prepolymer.

A chain transfer agent (containing at least one thiol group) is used to control the molecular weight of the resultant intermediary copolymer. Where a chain transfer has a reactive functional group such as amine, hydroxyl, carboxyl, epoxy, isocyanate, azlactone, or aziridine group, it can provide terminal or pendant functionality (amine, hydroxyl, carboxyl, epoxy, isocyanate, azlactone, or aziridine group) for subsequent ethylenical functionalization of the resultant intermediary copolymer.

In a preferred embodiment, an actinically-crosslinkable silicone-containing prepolymer of the invention is a water-processable prepolymer that has a high water solubility or dispersibility of at least about 5%, preferably at least about 10%, more preferably at least about 20% by weight in water. The prepolymer is capable of being actinically crosslinked, in the absence of one or more vinylic monomers, to form a silicone hydrogel contact lens having a water content of from about 20% to about 75% (preferably from about 25% to about 70%, more preferably from about 30% to about 65%) by weight when fully hydrated, an oxygen permeability (Dk) of at least about 40 barrers (preferably at least about 50 barrers, more preferably at least about 60 barrers, and even more preferably at least about 70 barrers). A water-processable prepolymer of the invention can find particular use in preparing silicone hydrogel ophthalmic lenses, in particular contact lenses.

In another aspect, the invention provides a soft contact lens. The soft contact lens of the invention comprises: a silicone hydrogel material that is obtained by curing a lens-forming material in a mold, wherein the lens-forming formulation (or material) comprises at least one actinically-polymerizable amphiphilic polysiloxane of the invention (as described above in detail) and/or at least one actinically-crosslinkable silicone-containing prepolymer of the invention (as described above in detail), wherein the contact lens has a water content of from about 20% to about 75% (preferably from about 25% to about 70%, more preferably from about 30% to about 65%) by weight when fully hydrated, an oxygen permeability (Dk) of at least about 40 barrers (preferably at least about 50 barrers, more preferably at least about 60 barrers, and even more preferably at least about 70 barrers), and an elastic modulus of from about 0.1 MPa to about 2.0 MPa, preferably from about 0.2 MPa to about 1.5 MPa, more preferably from about 0.3 MPa to about 1.2 MPa, even more preferably from about 0.4 MPa to about 1.0 MPa. The lens-forming formulation for obtaining a soft contact lens of the invention can further comprise one or more components selected from the group consisting of a hydrophilic vinylic monomer, a siloxane-containing vinylic monomer, a non-silicone crosslinker, a photoinitiator, a thermal initiator, a UV-absorbing vinylic monomer, a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof.

A person skilled in the art knows well how to measure the oxygen permeability, oxygen transmissibility, water content and elastic modulus of silicone hydrogel contact lenses. These lens properties have been reported by all manufacturers for their silicone hydrogel contact lens products.

Various embodiments of actinically-polymerizable amphiphili polysiloxanes of formula (1) or (2), siloxane-containing vinylic monomers, non-silicone crosslinkers, actinically-crosslinkable silicone containing prepolymers of the inventions, hydrophilic vinylic monomers, UV-absorbing vinylic monomers, solvents, photoinitiators, and thermal initiators are described above and can be used in this aspect of the invention.

The bioactive agent incorporated in the polymeric matrix is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crosslinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The weight-average molecular weight $M_w$ of the non-crosslinkable hydrophilic polymer is preferably from 5,000 to 500,000, more preferably from 10,000 to 300,000, even more preferably from 20,000 to 100,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In accordance with the invention, a lens-forming formulation (or material) is a fluid composition, which can be a solution or a melt at a temperature from about 20° C. to about 85° C. A lens forming formulation can be prepared by dissolving all of the desirable components in any suitable solvent known to a person skilled in the art, e.g., any one solvent described above. Preferably, a lens-forming material is a solution of all the desirable components in water, 1,2-propylene glycol, a polyethyleneglycol having a molecular weight of about 400 Daltons or less, or a mixture thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In accordance with the invention, the lens-forming formulation (or composition) can be introduced (dispensed) into a cavity formed by a mold according to any known methods.

After the lens-forming composition is dispensed into the mold, it is polymerized to produce a contact lens. Crosslinking may be initiated thermally or actinically, preferably by exposing the lens-forming composition in the mold to a spatial limitation of actinic radiation to crosslink the polymerizable components in the lens-forming composition.

Where the lens-forming composition comprises a UV-absorbing vinylic monomer, a benzoylphosphine oxide photoinitiator is preferably used as the photoinitiator in the invention. Preferred benzoylphosphine oxide photoinitiators include without limitation 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. It is understood that any photoinitiators other than benzoylphosphine oxide initiators can be used in the invention.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above. Preferably, water or an aqueous solution is used as extraction solvent. After extraction, lenses can be hydrated in water or an aqueous solution of a wetting agent (e.g., a hydrophilic polymer).

The molded contact lenses can further subject to further processes, such as, for example, surface treatment, packaging in lens packages with a packaging solution which can contain about 0.005% to about 5% by weight of a wetting agent (e.g., a hydrophilic polymer described above or the like known to a person skilled in the art) and/or a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof); sterilization such as autoclave at from 118 to 124° C. for at least about 30 minutes; and the like.

In a further aspect, the invention provides a method for making silicone hydrogel contact lenses. The method comprises the steps of: introducing a lens formulation into a mold for making contact lenses, wherein the lens-forming formulation comprises (a) a solvent selected from the group consisting of water, 1,2-propylene glycol, a polyethyleneglycol having a molecular weight of about 400 Daltons or less, and mixtures thereof, (b) at least one actinically-polymerizable amphiphilic polysiloxane of formula (1) or (2) (as described above in detail) and/or at least one actinically-crosslinkable silicone containing prepolymer of the invention as described above in detail, and (c) at least one component selected from the group consisting of a hydrophilic vinylic monomer (as described above in detail), a hydrophilized siloxane-containing vinylic monomer (as described above in detail), a hydrophilic crosslinker (as described above in detail), a photoinitiator (as described above in detail), a thermal initiator (as described above in detail), a UV-absorbing vinylic monomer (as described above in detail), a visibility tinting agent (e.g., dyes, pigments, or mixtures thereof), antimicrobial agents (e.g., preferably silver nanoparticles), a bioactive agent (as described above in detail), leachable lubricants (as described above in detail), leachable tear-stabilizing agents (as described above in detail), and mixtures thereof; polymerizing the lens formulation in the mold to form a silicone hydrogel contact lens, wherein the formed silicone hydrogel contact lens has a water content of from about 20% to about 75% (preferably from about 25% to about 70%, more preferably from about 30% to about 65%) by weight when fully hydrated, an oxygen permeability (Dk) of at least about 40 barrers (preferably at least about 50 barrers, more preferably at least about 60 barrers, and even more preferably at least about 70 barrers), and an elastic modulus of from about 0.1 MPa to about 2.0 MPa, preferably from about 0.2 MPa to about 1.5 MPa, more preferably from about 0.3 MPa to about 1.2 MPa, even more preferably from about 0.4 MPa to about 1.0 MPa.

Various embodiments of amphiphilic siloxane-containing vinylic monomers of formula (I), actinically-crosslinkable silicone containing prepolymers of the invention, lens forming formulations, hydrophilic vinylic monomers, hydrophilized polysiloxane-containing crosslinkers, hydrophilic crosslinkers, solvents, UV-absorbing vinylic monomers, photoinitiators, thermal initiators, visibility tinting agents, antimicrobial agents, bioactive agents, leachable lubricants, leachable tear-stabilizing agents, molds, polymerizing techniques, and post molding processes are described above and can be used in this aspect of the invention.

In a preferred embodiment, the resultant silicone hydrogel contact lens is extracted with water or an aqueous solution.

In another preferred embodiment, the mold is a reusable mold and the lens-forming composition is cured (i.e., polymerized) actinically under a spatial limitation of actinic radiation to form a silicone hydrogel contact lens. Examples of preferred reusable molds are those disclosed in U.S. Pat. Nos. 6,627,124, 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, and combinations thereof.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

The previous disclosure will enable one having ordinary skill in the art to practice the invention. In order to better enable the reader to understand specific embodiments and the advantages thereof, reference to the following non-limiting examples is suggested. However, the following examples should not be read to limit the scope of the invention.

Example 1

Oxygen Permeability Measurements

The apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ $mm^2$/minute.

Example 2
Synthesis of Bisacrylamide-PDMS with Pendent Low Molecular Weight Hydrophiles or Functional Groups
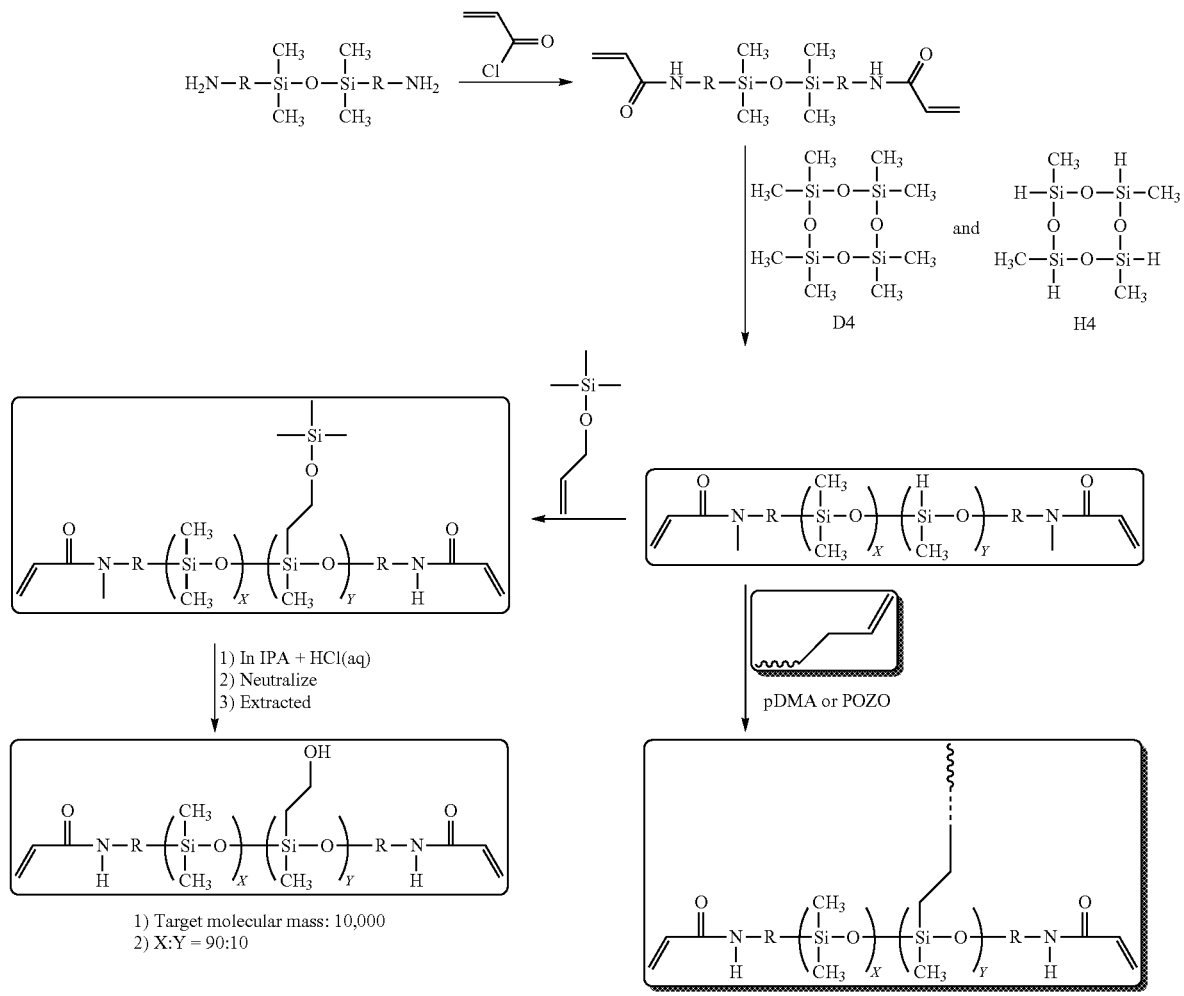
Example 3
Synthesis of POZO with Allyl Terminal Group
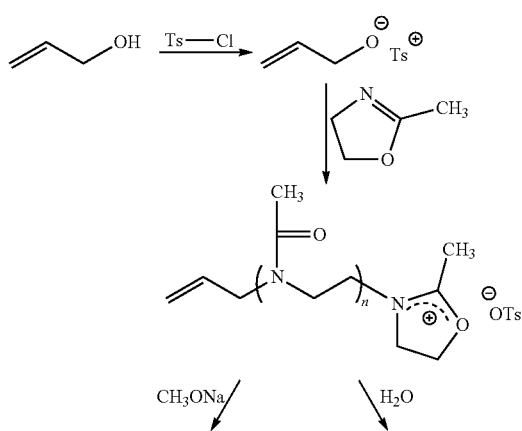
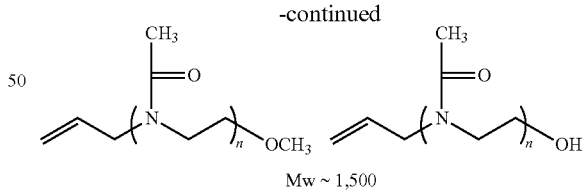
Mw ~ 1,500
Example 4
Synthesis of pDMA with Ally Terminal Group
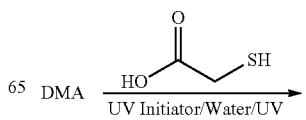

-continued
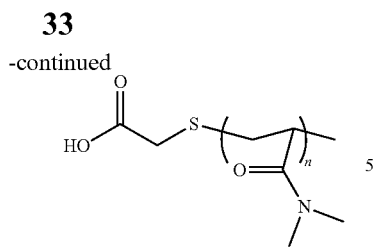
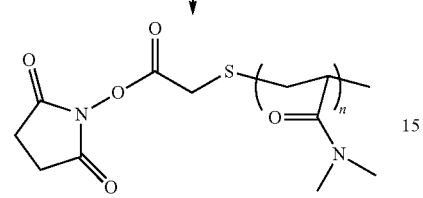
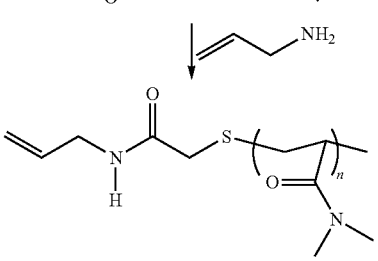
Example 5
Synthesis of pDMA with Ally Terminal Group Via ATRP
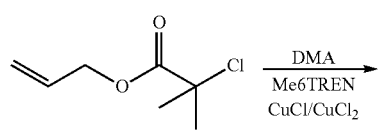
-continued
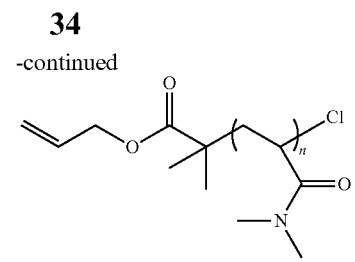
Example 6
Synthesis of pDMA with RAFT
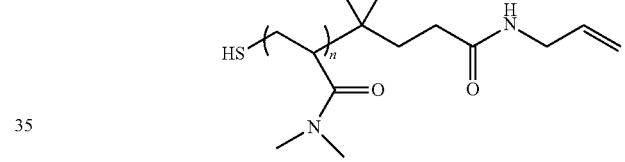
Example 7
Synthesis of PDMS with Pendent Low Molecular Weight Hydrophiles with Cross-Linkable Functional Groups
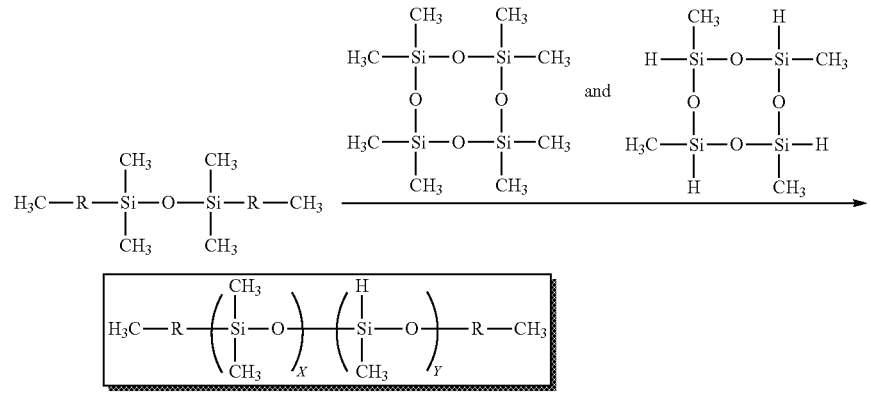
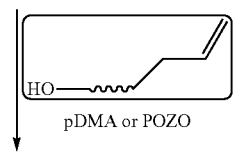
pDMA or POZO

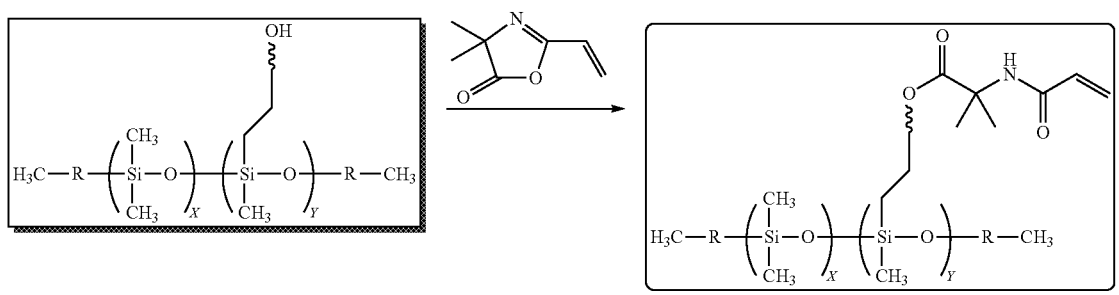
Example 8
Synthesis of pDMA with Dual Functional Groups
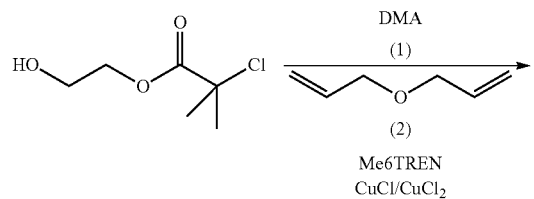
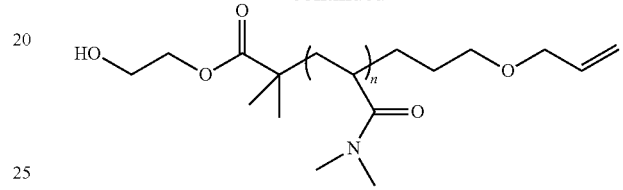
Example 9
The Synthetic Approach to Macromers (Macromer with Multiple pDMS and pDMA can be Prepared by Controlling the Ratio of Trimethoxysilane to OH)
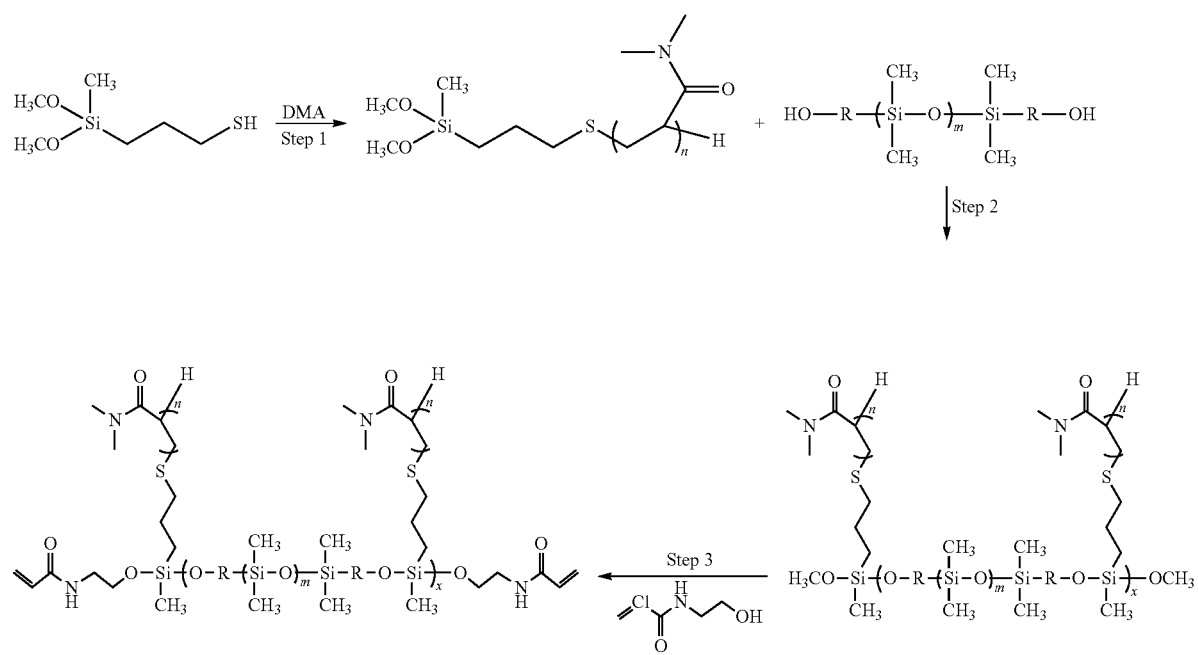

What is claimed is:

1. An actinically-polymerizable amphiphilic polysiloxane of formula (1) or (2)

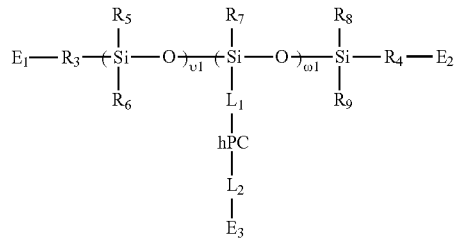

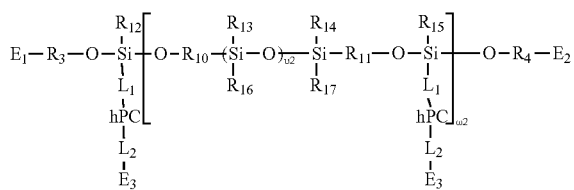

in which:
- $v1$, $v2$, and $\omega1$ independently of one another are an integer of from 1 to 500;
- $\omega2$ independent of each other are an integer of from 1 to 10;
- $R_3$ and $R_4$, independently of each other, are a direct bond or a substituted or unsubstituted $C_1$-$C_{10}$ alkylene divalent radical;
- $R_{10}$ and $R_{11}$, independently of each other, are a substituted or unsubstituted $C_1$-$C_{10}$ alkylene divalent radical;
- $R_5$, $R_6$, $R_7$, $R_8$, $R_9$, $R_{12}$, $R_{13}$, $R_{14}$, $R_{15}$, $R_{16}$, and $R_{17}$, independently of one another, are $C_1$-$C_8$-alkyl, $C_1$-$C_4$ alkyl- or $C_1$-$C_4$ alkoxy-substituted phenyl, or fluoro-substituted $C_1$-$C_{18}$-alkyl;
- $L_1$ is a divalent radical of

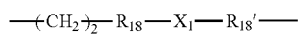

in which $R_{18}$ is a substituted or unsubstituted $C_1$-$C_{10}$ alkylene divalent radical and $R_{18}'$ is a direct bond or a substituted or unsubstituted $C_1$-$C_{10}$ alkylene divalent radical, $X_1$ is a direct bond, a thio ether bond (—S—), —$NR_{20}$— in which $R_{20}$ is a substituted or unsubstituted $C_1$-$C_{10}$ alkyl, or a divalent radical of

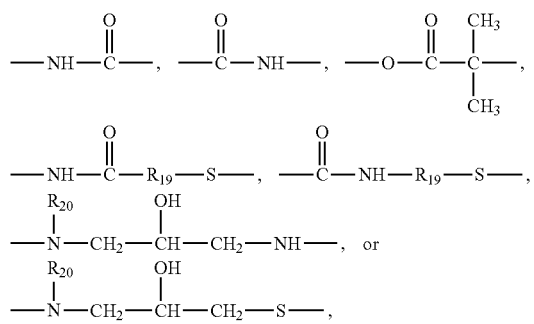

in which $R_{19}$ is a substituted or unsubstituted $C_1$-$C_{10}$ alkylene divalent radical and $R_{20}$ is a substituted or unsubstituted $C_1$-$C_{10}$ alkyl;

$L_2$ is a direct bond or a substituted or unsubstituted $C_1$-$C_{10}$ alkylene divalent radical;

$E_1$, $E_2$ and $E_3$, independent of one another, are hydrogen, substituted or unsubstituted $C_1$-$C_8$-alkyl, $C_1$-$C_8$-alkoxy, —$NH_2$, —NHR' with R' being $C_1$-$C_{10}$ alkyl, hydroxyl, carboxyl, Br, Cl, thiol, or a polymerizable group which is

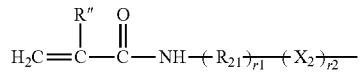

in which r1 and r2 independent of each other are integer of 0 or 1, R" is hydrogen or methyl, $R_{21}$ is a substituted or unsubstituted $C_1$-$C_{10}$ alkylene divalent radical, $X_2$ is

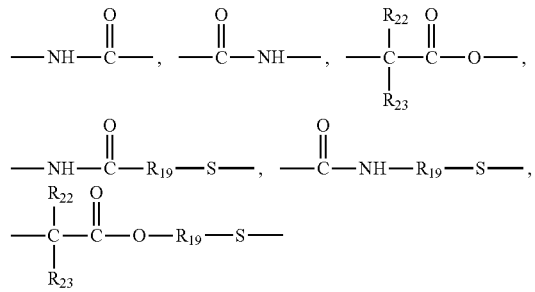

in which $R_{22}$ and $R_{23}$ independent of each other are $C_1$-$C_8$ alkyl, and $R_{19}$ is a substituted or unsubstituted $C_1$-$C_{10}$ alkylene divalent radical, provided that either (i) $E_1$ and $E_2$ both are a polymerizable group or (ii) $E_3$ is a polymerizable group; and hPC is a hydrophilic polymer segment selected from the group consisting of (1) polyoxazoline segment

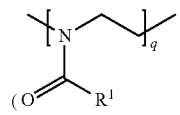

in which $R^1$ is hydrogen, methyl or ethyl group, and q is an integer from 3 to 500) which is obtained in a ring-opening polymerization of oxazoline, (2) a polypeptide segment composed of at least one amino acid selected from the group consisting of asparagine, glutamine, alanine, glycine, and combinations thereof, and (3) a hydrophilic polymer segment composed of hydrophilic monomeric units derived from at least one hydrophilic vinylic monomer selected from the group consisting of (meth)acrylamide, N,N-dimethyl (meth)acrylamide, dimethylaminoethyl (meth)acrylate, dimethylaminoethyl (meth)acrylamide, N-vinyl-2-pyrrolidone, N-vinyl-N-methyl isopropylamide, N-vinyl-N-methyl acetamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5- methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and mixtures thereof.

2. The actinically-polymerizable amphiphilic polysiloxane of claim 1, wherein $E_1$ and $E_2$ are an polymerizable group of

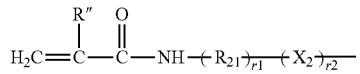

in which R″, $R_{21}$, $X_2$, r1 and r2 are as defined above while $E_3$ is hydrogen, substituted or unsubstituted $C_1$-$C_8$-alkyl, $C_1$-$C_8$-alkoxy, —$NH_2$, —NHR' with R' being $C_1$-$C_{10}$ alkyl, hydroxyl, carboxyl, Br, Cl, or thiol.

3. The actinically-polymerizable amphiphilic polysiloxane of claim 1, wherein $E_1$ and $E_2$ are hydrogen, substituted or unsubstituted $C_1$-$C_8$-alkyl, $C_1$-$C_8$-alkoxy, —$NH_2$, —NHR' with R' being $C_1$-$C_{10}$ alkyl, hydroxyl, carboxyl, Br, Cl, or thiol while $E_3$ is an polymerizable group polymerizable group of

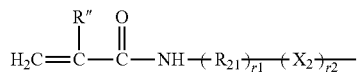

in which R″, $R_{21}$, $X_2$, r1 and r2 are as defined above.

4. The actinically-polymerizable amphiphilic polysiloxane of claim 1, wherein $E_1$, $E_2$ and $E_3$ are an polymerizable group polymerizable group of

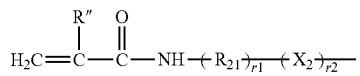

in which R″, $R_{21}$, $X_2$, r1 and r2 are as defined above.

5. The actinically-polymerizable amphiphilic polysiloxane of claim 1, wherein $R_{12}$, $R_{13}$, $R_{14}$, $R_{15}$, $R_{16}$, and $R_{17}$ are methyl.

6. The actinically-polymerizable amphiphilic polysiloxane of claim 1, wherein v2 is an integer of an integer of from 3 to 350 while ω2 is an integer of from 1 to 10.

7. The actinically-polymerizable amphiphilic polysiloxane of claim 1, wherein hPC is a hydrophilic polymer segment composed of hydrophilic monomeric units derived from at least one hydrophilic vinylic monomer selected from the group consisting of N-vinylpyrrolidone, N,N-dimethyl (meth)acrylamide, (meth)acrylamide, N-vinyl formamide, N-vinyl acetamide, N-vinyl isopropylamide, N-vinyl-N-methyl acetamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, and combinations thereof, and combinations thereof.

8. The actinically-polymerizable amphiphilic polysiloxane of claim 7, being represented by formula (1).

9. The actinically-polymerizable amphiphilic polysiloxane of claim 8, wherein v1:ω1 is from about 7:3 to about 9.5:0.5.

10. The actinically-polymerizable amphiphilic polysiloxane of claim 1, wherein hPC is a polyoxazoline segment.

11. The actinically-polymerizable amphiphilic polysiloxane of claim 10, being represented by formula (1).

12. The actinically-polymerizable amphiphilic polysiloxane of claim 11, wherein v1:ω1 is from about 7:3 to about 9.5:0.5.

13. The actinically-polymerizable amphiphilic polysiloxane of claim 7, being represented by formula (2).

14. The actinically-polymerizable amphiphilic polysiloxane of claim 10, being represented by formula (2).

15. A polymer comprising repeating units of an actinically-polymerizable amphiphilic polysiloxane of claim 1.

16. The polymer of claim 15, wherein the polymer is an actinically-crosslinkable silicone-containing prepolymer which further comprises hydrophilic units of at least one hydrophilic vinylic monomer.

* * * * *